(12) United States Patent
Patel et al.

(10) Patent No.: US 8,802,018 B2
(45) Date of Patent: Aug. 12, 2014

(54) APPARATUS AND METHOD FOR RADIATION PROCESSING OF FLUENT FOOD PRODUCTS

(75) Inventors: Shekhar Patel, East Windsor, NJ (US); Laurence J. Kiely, Westford, VT (US)

(73) Assignee: Nestec S.A., Vevey (CH)

( * ) Notice: Subject to any disclaimer, the term of this patent is extended or adjusted under 35 U.S.C. 154(b) by 1568 days.

(21) Appl. No.: 11/815,789

(22) PCT Filed: Feb. 8, 2006

(86) PCT No.: PCT/US2006/004360
§ 371 (c)(1),
(2), (4) Date: Jul. 17, 2008

(87) PCT Pub. No.: WO2006/086427
PCT Pub. Date: Aug. 17, 2006

(65) Prior Publication Data
US 2008/0286424 A1    Nov. 20, 2008

Related U.S. Application Data

(60) Provisional application No. 60/651,796, filed on Feb. 10, 2005.

(51) Int. Cl.
*B01J 19/08* (2006.01)
(52) U.S. Cl.
USPC ............................................ 422/186
(58) Field of Classification Search
USPC ....................................... 422/186
See application file for complete search history.

(56) References Cited

U.S. PATENT DOCUMENTS

| | | |
|---|---|---|
| 3,766,031 A | 10/1973 | Dillon |
| 3,901,807 A | 8/1975 | Trump |
| 4,255,663 A | 3/1981 | Lewis |
| 4,748,005 A | 5/1988 | Neuberg et al. |
| 4,777,192 A | 10/1988 | Neuberg et al. |
| 4,902,411 A | 2/1990 | Lin |
| 4,974,503 A | 12/1990 | Koch |
| 4,998,486 A | 3/1991 | Dighe et al. |
| 5,008,550 A | 4/1991 | Barrett |
| 5,530,255 A * | 6/1996 | Lyons et al. ............. 250/492.3 |
| 5,597,597 A | 1/1997 | Newman |
| 6,096,379 A | 8/2000 | Eckhoff |
| 6,191,424 B1 | 2/2001 | Stirling et al. |
| 6,432,279 B1 * | 8/2002 | Zanta ........................ 204/157.5 |
| 6,592,816 B1 | 7/2003 | Ebel et al. |
| 6,653,641 B2 | 11/2003 | Lyons et al. |
| 6,686,596 B2 | 2/2004 | Woodburn et al. |
| 6,737,660 B2 | 5/2004 | Miura et al. |

(Continued)

FOREIGN PATENT DOCUMENTS

| | | |
|---|---|---|
| DE | 1951633 | 5/1971 |
| DE | 3624169 | 1/1987 |

(Continued)

*Primary Examiner* — Kishor Mayeka
(74) *Attorney, Agent, or Firm* — Gary M. Lobel

(57) ABSTRACT

An apparatus, system, and method of irradiating fluent food products. The present invention utilizes a transmissive wall having a convex surface. A source of radiation is positioned on a side of the transmissive wall that is opposite the convex surface so that when the radiation source is emitting radiation energy, the radiation energy passes through the transmissive wall, thereby irradiating fluent food product that is flowing in contact with the convex surface.

23 Claims, 13 Drawing Sheets

(56) References Cited

U.S. PATENT DOCUMENTS

| | | |
|---|---|---|
| 6,781,137 B2 | 8/2004 | Snowball |
| 6,806,476 B2 | 10/2004 | Rose et al. |
| 6,818,568 B2 | 11/2004 | Tanaka |
| 7,067,822 B2 * | 6/2006 | Lyons et al. .......... 250/435 |
| 2001/0030295 A1 | 10/2001 | Holl |
| 2002/0162971 A1 | 11/2002 | Koenck et al. |
| 2003/0064001 A1 | 4/2003 | Fries et al. |
| 2003/0161753 A1 | 8/2003 | MacPhee et al. |
| 2004/0013562 A1 | 1/2004 | Burgess et al. |
| 2004/0033160 A1 | 2/2004 | MacPhee et al. |
| 2004/0113094 A1 | 6/2004 | Lyons et al. |
| 2004/0126273 A1 | 7/2004 | Forney et al. |

FOREIGN PATENT DOCUMENTS

| | | |
|---|---|---|
| EP | 0265031 | 4/1998 |
| SU | 1146968 | 8/1994 |
| WO | WO 96/36868 | 11/1996 |
| WO | WO 2004/009137 | 1/2004 |
| WO | WO 2004/009143 | 1/2004 |

* cited by examiner

Effect of E-Beam on E.sakazakii in Skim Milk Powder $y = -0.591x + 7.683$
$R^2 = 0.9785$

Figure 13

APPARATUS AND METHOD FOR RADIATION PROCESSING OF FLUENT FOOD PRODUCTS

This application is a 35 U.S.C. §371 national phase application of International Appl. No. PCT/US2006/004360, filed Feb. 8, 2006, which, in turn, claims the benefit of priority to U.S. Provisional Appl. No. 60/651,796, filed Feb. 10, 2005, each of which is hereby incorporated by reference in its entirety.

FIELD OF THE INVENTION

The present invention relates generally to the field of irradiating food products, and specifically to the field of irradiating fluent food products to reduce levels of biological contaminants or pathogens.

BACKGROUND OF THE INVENTION

Many food products that are prepared for human and/or animal consumption contain unwanted and potentially dangerous biological contaminants or pathogens, such as, for example, microorganisms, viruses, bacteria, (including inter- and intracellular bacteria, such as mycoplasmas, ureaplasmas, nanobacteria, chlamydia, rickettsias), yeasts, molds, fungi, prions or similar agents. Consequently, it is of utmost importance that these biological contaminants or pathogens be inactivated before the food product is used. This is especially critical when the material is to be administered to an infant or to a patient that has an immune deficiency disease or a weakened state of immunity.

Two technologies that are currently employed to reduce biological contaminant or pathogen levels in powdered food products are: (1) exposing the food products to chemical agents in gaseous form; and (2) irradiating the food products. It has been found that treating food products with gaseous chemical agents may adversely impact the food product's final quality and, in some instances, may even contaminate the food product. As a result, the industry has now focused on the process of irradiating food products to reduce biological contaminant and pathogen levels.

Irradiation technology for food sterilization has been scientifically understood for many years dating back to the 1940's. An increasing concern for food safety and effective medical sterilization has recently resulted in expanded government regulatory approval of irradiation technology for food processing. Because irradiation has proven to be an effective means of reducing the population of harmful biological contaminants and/or pathogens, United States Government regulatory agencies have approved the use of irradiation processing of various foods.

The three approved sources of ionizing radiation for irradiation food processing are (1) gamma rays (typically formed by radioisotopes of cobalt or cesium); (2) x-rays; and (3) beams of accelerated electrons (i.e., e-beams). With respect to x-rays and e-beams, the U.S. Government has mandated maximum allowable energies for food irradiation. By maintaining the energy at or below the mandated maximum energy levels, effective irradiation of the food product may be achieved without causing surrounding materials to become radioactive and without destroying beneficial characteristics/ properties of the food products. The currently established maximum allowable energies for x-rays and e-beams are 5 million electron volts (MeV) and 10 MeV respectively.

While the use of gamma source radiation for food irradiation purposes is simple and effective, it is also expensive and hazardous to handle, transport, store and use. In comparison, e-beam and x-ray irradiation processing require relatively little equipment and shielding, can be brought within close proximity of manufacturing lines, and can be turned on and off as needed. For these reasons, e-beam and x-ray irradiation have become the preferred technologies for food product irradiation.

The ionizing radiation provided by e-beams is in the form of electrons. In the case of x-rays, the ionizing radiation is typically provided by photons. Because photons have no mass, the photons produced by x-ray sources are able to penetrate deep into materials. However, because electrons have a small mass, the electrons provided during e-beam processing have a more limited penetration depth.

Existing e-beam and x-ray irradiation systems employ electron accelerators to either emit high velocity electrons directly for irradiation or to cause high velocity electrons to collide with a metal conversion plate which results in the emission of x-rays. A number of electron acceleration techniques have been developed over the past several decades including electrostatic acceleration, vacuum pumped cylindrical accelerators, and linear accelerators.

Over the past decade, substantial efforts have been undertaken to develop systems and methods that can safely and effectively irradiate food products in an industrial setting. However, in an industrial setting, a number of competing goals exist, such as: (1) maximizing throughput of the food product; (2) guaranteeing effective and safe levels of irradiation of the food product; (3) minimizing costs associated with the irradiating process; and (4) protecting personnel from radiation exposure.

In order to protect personnel from radiation exposure, food irradiation often takes place in a sealed area, which effectively contains the radiation. Existing systems achieve this goal by incorporating automated means for delivering the food to the radiation source, thereby eliminating direct human intervention and the associated shutdown and startup times. Thus, large-scale application of food irradiation requires an apparatus and method to deliver large quantities of food to the radiation means, without direct human intervention, and on a continuous basis.

A number of irradiation systems have been developed for industrial irradiation processing of food products. Examples of such systems are disclosed in U.S. Pat. No. 6,653,641, (Lyons et al); U.S. Pat. No. 6,096,379, (Eckhoff); U.S. Pat. No. 5,008,550, (Barrett); and U.S. Patent Application Publication No. 2002/0162971, (Koeneck et al). However, existing food irradiation systems suffer from a number of drawbacks, especially when used to process fluent food products.

Conveyor-type irradiation processing systems are either incapable of processing certain fluent products, such as liquids or gases, or are inefficient in exposing the fluent food product to sufficient and/or consistent dose(s) of radiation due to shifting of the fluent food product on the conveyor belt. When fluent food products, such as powders and granular materials, are placed on conveyor-type systems for irradiation processing, changes in the speed and/or direction of the conveyor belt tend to shift the fluent food product, resulting in the food product having an inconsistent depth during radiation exposure. Variations in the depth of the fluent food product affect the actual dose of radiation to which an amount of fluent food product receives, especially during e-beam processing where penetration depth is limited. For example, increasing the depth of the fluent food product results in the radiation being unable to penetrate the fluent food product and sufficiently irradiate the fluent food product adjacent to the conveyor belt. As a result, the same food product may have to be subjected to the radiation energy numerous times. This negatively affects product throughput.

Existing radiation processing systems compensate for inconsistencies in the actual dose of radiation that fluent food product receives by applying the radiation energy at increased power or dosage levels to ensure that all of the fluent food product actually receives a sufficient dose of radiation. Typically, these increased power or dose levels are on the magnitude of 2-5 times greater than a target power or dose level that would theoretically deliver the sufficient dose of radiation energy to the fluent product. In other words, the radiation energy is applied at a theoretically sufficient target power or dose multiplied by a safety factor of 2-5. Greater power and dose levels result in increased energy consumption, increased propessing costs, and, in some instances, undesirable heating of the fluent food product.

A further drawback of existing radiation processing systems is that they typically use linear shaped irradiation chambers. Typical sources of radiation, however, produce radiation energy in radiant patterns. Thus, as the food product passes through these linear irradiation chambers, the radiation energy strikes the food product at a normal angle for only a short period. This results in a less than optimal transfer of radiation energy to the food product, resulting in an increased amount of power being used to effectuate exposure to a sufficient radiation dose.

SUMMARY OF THE INVENTION

It is therefore an object of the present invention to provide an apparatus, system, and method for irradiating fluent food products.

Another object of the present invention is to provide an apparatus, system, and method for irradiating fluent food products in a more efficient and/or cost effective manner.

Yet another object of the present invention is to provide an apparatus, system, and method for irradiating fluent food products that increases throughput.

A further object of the present invention is to provide an apparatus, system, and method for irradiating fluent food products that reliably exposes the fluent food product to at least a desired dose of radiation.

A still further object of the present invention is to provide an apparatus, system, and method for irradiating fluent food products that reduces energy consumption while maintaining throughput.

Still another object of the present invention is to provide an apparatus, system, and method for irradiating fluent food products that requires a reduced safety factor that still ensures that a desired dose of radiation dose is delivered to a fluent food product.

The present invention includes apparatus and methods that can meet these and other objects. The present invention, in one aspect, provides an apparatus for radiation processing of fluent food products comprising: a radiation source; a first wall having a convex surface, the first wall being transmissive to radiation energy produced by the radiation source; a second wall having a surface that opposes the convex surface of the first wall so as to form a product flow cavity therebetween; an inlet forming a passageway into the product flow cavity; an outlet forming a passageway out of the product flow cavity; and wherein the first wall is positioned between the radiation source and the product flow cavity so that when the radiation source emits radiation energy, the radiation energy passes through the first wall and into the product flow cavity. In some embodiments, it is preferred that the surface of the second wall that opposes the convex surface of the wall be a concave surface.

In another aspect, the invention provides a fluent food product processing system comprising the apparatus described above and one or more fluent food products.

In yet another aspect, the invention provides methods of irradiating fluent food products comprising: providing an apparatus comprising a radiation source, a first wall having a convex surface, and a second wall having a surface, wherein the surface of the second wall opposes the convex surface of the first wall so as to form a product flow cavity therebetween, wherein the first wall is transmissive to the radiation energy emitted by the radiation source, and wherein the first wall is positioned between the radiation source and the product flow cavity; introducing a fluent food product into the product flow cavity via an inlet to the product flow cavity; flowing the fluent food product through the product flow cavity; and exposing the fluent product to radiation energy emitted by the radiation source, the radiation energy being emitted by the radiation source, passing through the first wall into the product flow cavity, and contacting the fluent food product moving through the product flow cavity.

In a further aspect, the invention provides methods of irradiating fluent food products comprising: providing an apparatus comprising a radiation source, a first wall having a convex surface, wherein the first wall is transmissive to radiation energy emitted by the radiation source, and wherein the radiation source is positioned on a side of the first wall that is opposite of the convex surface; flowing a fluent food product onto the convex surface of the first wall; and exposing the fluent product to radiation energy emitted by the radiation source, the radiation energy being emitted by the radiation source, passing through the first wall, and contacting the fluent food product.

In a still further aspect, the invention provides methods of irradiating fluent food products to reduce levels of one or more biological contaminants or pathogens, the methods comprising: (a) flowing a fluent food product having one or more biological contaminants or pathogens through a product flow cavity at a predetermined flow rate; (b) producing radiation energy at a predetermined power and a predetermined energy level; (c) exposing the fluent food product to an actual dose ($D_A$) of the radiation energy produced as the fluent food product flows through the product flow cavity, wherein the $D_A$ is at or above a desired dose that is sufficient to effectively reduce levels of the one or more biological contaminants or pathogens; wherein the predetermined power is chosen such that a theoretical dose ($D_T$) of the radiation energy will be transmitted to the fluent food product when flowing through the product flow cavity at the predetermined flow rate, wherein the $D_T$ is equal to the $D_A$ times a safety factor (SF); and wherein the SF is less than approximately 3.0. Preferably the SF is less than 1.8, and most preferably less than 1.2.

In a yet further aspect, the invention provides fluent food products treated by any of the above described methods.

BRIEF DESCRIPTION OF THE DRAWINGS

FIG. 13 is a graph of experimental data comparing actual dose level vs. *E. sakazakii*.

DETAILED DESCRIPTION OF THE DRAWINGS

The Irradiation System

Figure 1:
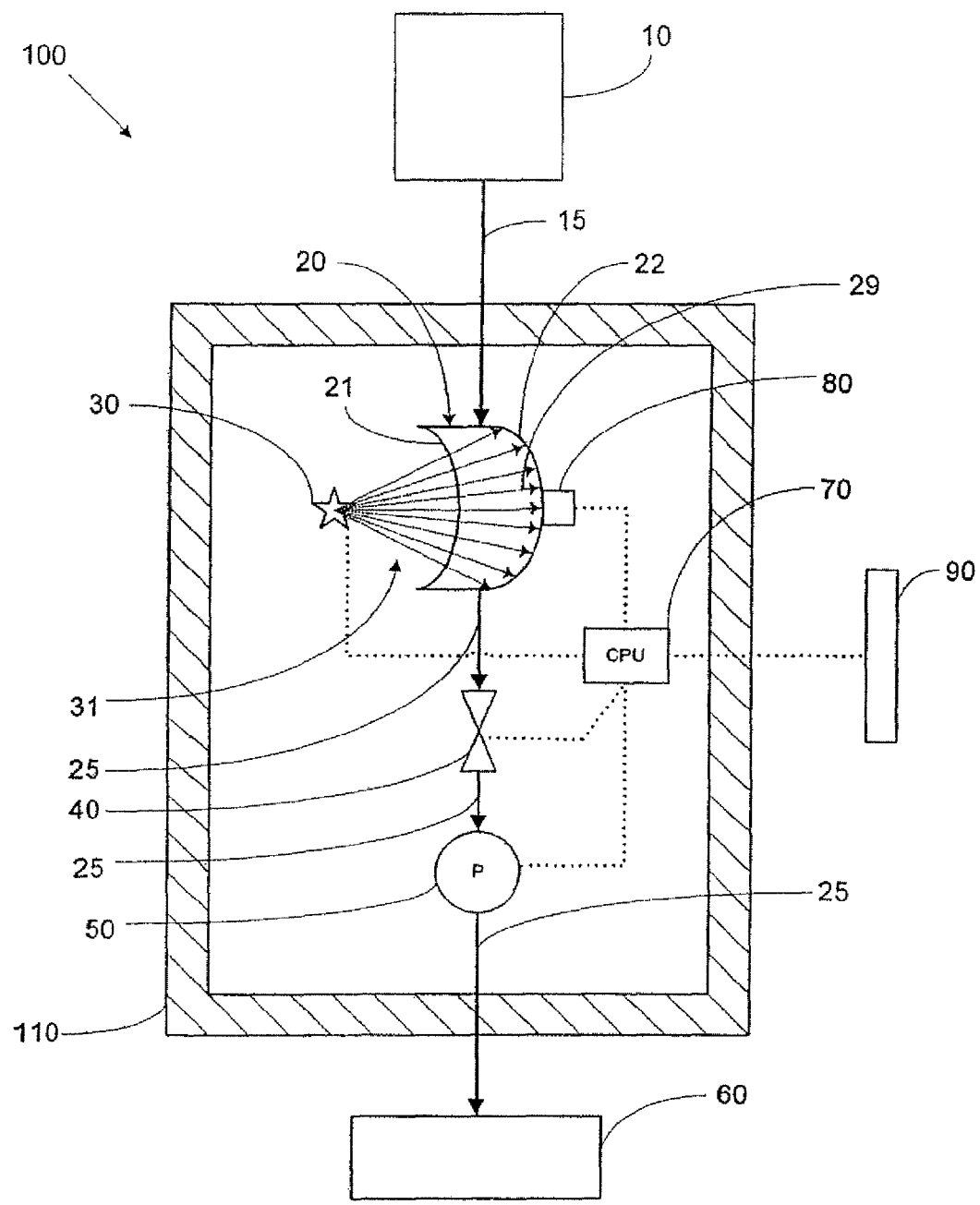
FIG. 1 is a schematic of a food irradiation system according to one embodiment of the present invention.

Referring to FIG. 1, an irradiation system 100 according to one embodiment of the present invention is illustrated. The irradiation system 100 is specifically designed to irradiate fluent food products effectively and efficiently for bulk/industrial processing. As used herein, the term fluent food product means any food product that when processed can be flowed, specifically including but not limited to liquids, gases, pastes, powders, granular materials (which includes small items processed in bulk, such as pills), gels, highly malleable materials, etc. The term food includes materials that are consumed either orally or intravenously. The invention, however, is not limited to use with fluent food products. The irradiation system 100 comprises a fluent food product source 10, an irradiation chamber 20, a radiation source 30, a control valve 40, a vacuum pump 50, a packager 60, a central processing unit (CPU) 70, and a radiation sensor 80, and a user interface 90.

The fluent food product source 10 can be a hopper, a tank, a silo, a bin, a reservoir, a conveyor belt, or any other device or space that can be used to hold, store, and/or transport a fluent food product. The fluent food product source 10 is fluidly connected to an inlet of the irradiation chamber 20 via supply line 15. An outlet of the irradiation chamber 20 is fluidly connected to the packager 60 via an outlet line 25. Thus, a product flow path is formed from the source 10 to the packager 60 to facilitate the irradiation processing of fluent food products. The product flow path extends from the fluent food product source 10, through the irradiation chamber 20, and to the packager 60. The control valve 40 and the vacuum pump 50 are operably connected to the outlet line 25 in series. As discussed in more detail below, the vacuum pump 50, when in an active state, facilitates the flow of a fluent food product along the product flow path by creating a vacuum differential. The flow-rate rate of the fluent food product along the product flow path is controlled by the control valve 40, which is preferably an adjustable valve.

The supply line 15 and the outlet line 25 can be pipes, ducts, or the like. The supply line 15 and the outlet line 25 can be constructed of any suitable material, including metals, alloys, plastics, polymers, approved by regulatory agencies like FDA, USDA, etc., or any other material which is safe to use for prolonged exposure to e-beams and the transport of the fluent food product that is to be carried therein. Preferably, the interior surfaces of the supply line 15 and the outlet line 25, and the irradiation chamber 20 are smooth so as to not significantly impede the flow of the fluent food product therethrough.

The supply line 15 and the outlet line 25 can be fluidly connected to the various components of the irradiation system 100 in a variety of ways, including welding, adhesion, taping, threaded connections combined with sealing tape, clamped connections, and compressed O-ring connections. The integrity level (i.e. the hermetic nature) of the fluid connection is dictated by the type of fluent food product intended to be flowed through the irradiation system 100. For example, if the fluent food product to be processed is a liquid or gas, all of the fluid connections will have to be hermetically sound. However, if the fluent food product to be processed is a granular food product, the fluid connections do not have to be hermetic in nature. Nonetheless, when a vacuum pump, such as the vacuum pump 50, is used to create the flow of the fluent food product along the product flow path, all fluid connections should be sufficiently hermetically sound so as to withstand the operating vacuum of the vacuum pump.

The radiation source 30 is positioned outside of the irradiation chamber 20 but within the housing 110. The type of radiation energy emitted from the radiation source will depend on the type of radiation source implemented. The radiation source can be any type of radiation source that is approved for irradiating food products, including a source of gamma radiation, a source of x-rays, or a source of e-beams. The exact type of radiation energy used by the irradiation system 100 will depend on the type of the fluent food product being processed, government regulations, design specifications, industry standards, positioning of the irradiation chamber 20 in relation to personnel work areas and other food processing equipment, user preferences, and the purpose for irradiating the fluent food product.

In the case of e-beams, the radiation may be conveyed to the irradiation chamber 20 through vacuum over any distance using magnetic field guides. The radiation will then be distributed over the food product by oscillating the e-beams using an electromagnetic device. The electromagnetic device is adapted to oscillate the source of e-beams. The source-beam oscillation device 30 is positioned a distance from the first wall 21 of the irradiation chamber 20, preferably in the range of 1 meter to 5 meter. The radiation oscillation source 30 distributes radiation energy (indicated by the dashed arrows 31) in a radiant pattern.

Sources of gamma radiation include, without limitation, radioisotopes of cobalt or cesium. Sources of a-beams include heated tungsten or platinum or other heavy metals with high melting point. X-rays are produced when e-beams strike heavy metals. Irrespective of the type of radiation source incorporated, gamma, e-beam, x-ray, or otherwise, the radiation source 30 can be configured to emit the radiation energy in a spherical, semi-spherical, cylindrical, or semi-cylindrical radiant pattern. The desired radiant pattern will be dictated by the design of the irradiation chamber 20. This will be discussed in more detail below with respect to FIGS. 2-8.

The irradiation chamber 20 comprises a first wall 21 and a second wall 22. The first wall 21 and the second wall 22 form a product flow cavity 29 therebetween. The product flow cavity 29 forms a portion of the product flow path from the fluent food product source 10 to the packager 60. At least a portion of the first wall 21 is transmissive to at least a fraction of the radiation energy 31 emitted by the radiation source 30. Preferably, the transmissive portion of the first wall 21 transmits the radiation energy 31 therethrough without a substantial energy loss (i.e., the transmissive portion of the first wall 21 is substantially transparent to the radiation energy 31).

The material of construction, the thickness, and the type of radiation energy 31 being emitted by the radiation source 30 are all factors that may affect the transmissive nature of the first wall 21. Suitable materials for constructing the transmissive portion of the first wall 21 include, without limitation, quartz, glass, plastics, polymers, thin metals or alloys. The preferred thickness of the transmissive portion of the first wall 21 will be dictated by the material of construction and the type of radiation energy 31 to be transmitted. While the thickness of the transmissive portion of the first wall 21 will be determined on a case by case basis, the transmissive portion of the first wall 21 should be sufficiently rigid to hold its shape under the vacuums experienced during processing and the loading exerted by the fluent food product.

The second wall 22 may be constructed so that it is or is not transmissive to the radiation energy 31. Preferably, the second wall is not significantly transmissive to the radiation energy 31. As with the first wall 21, the material of construction of the second wall 22, the thickness of the second wall 22, and the type of radiation energy 31 being emitted by the radiation source 30 are all factors that may affect whether or not the second wall 22 is transmissive to the radiation energy 31. Suitable materials for constructing the second wall 32 include, without limitation, concrete, quartz, glass, plastics, paperboards, paper, polymers, thin metals or alloys In some embodiments, a third wall (not illustrated) may be added to the opposite side of the second wall 22. The third wall may be constructed so that it is or is not transmissive to the radiation energy 31. Preferably, the third wall is not significantly transmissive to the radiation energy 31. As with the first wall 21, the material of construction of the third wall, the thickness of the third wall, and the type of radiation energy 31 being emitted by the radiation source 30 are all factors that may affect whether or not the third wall is transmissive to the radiation energy 31. Suitable materials for constructing the third wall 32 include, without limitation, concrete, lead, steel other heavy metal. The third wall forms an additional cavity with the second wall 22. This additional cavity may be used/adapted to carry heat-exchanging liquids like water. The heat exchanging liquids meant to quench the heat generated by the residual energy that might escape the first and second walls 21, 22.

The radiation source 30 is aligned with the first wall 21 so that radiation energy 31 emitted by the radiation source 30 passes through the transmissive portion of the first wall 21 and into the product flow cavity 29 of the irradiation chamber 20. Thus, when the radiation source 30 emits radiation energy 31 and fluent food product is passing through the product flow cavity 29, the fluent food product is exposed to the radiation energy 31. The dose of radiation energy 31 to which the fluent food product is exposed can be precisely controlled by adjusting the flow-rate of the fluent food product through the product flow cavity 29, the depth of the product flow cavity 23 and/or the power of the radiation energy 31. Adjusting either the control valve 40 and/or the vacuum pump 50 can control the flow-rate of the fluent food product.

The CPU 70 is operably and electrically connected to the vacuum pump 50, the control valve 40, the radiation source 30, the radiation sensor 80, and the user interface 90 for communication therewith. The CPU 70 is a suitable microprocessor based programmable logic controller, personal computer, or the like for process control and preferably includes various input/output ports used to provide connections to the various components 30, 40, 50, 80, 90 of the irradiation system 100 that may need to be controlled and/or communicated with.

The CPU 70 also preferably comprises sufficient memory to store process recipes, parameters, and other data, such as target radiation dosage, flow rates, processing times, processing conditions, operating power levels, and the like. The CPU 70 can communicate with any and all of the various components of the irradiation system 100 to which it is operably connected in order to automatically adjust process conditions, such as flow rates, radiation energy levels, radiation power levels, vacuum pump activation, etc., to achieve desired conditions. The CPU 70 is programmed to receive data signals from the radiation sensor 80, analyze the data signals, and make the appropriate adjustments to achieve a desired radiation dose for the fluent food product being processed. The type of controller used depends on the exact needs of the system in which it is incorporated.

During typical operation of irradiation system 100, an operator inputs a system activation signal via user interface 90, which can be a keyboard, mouse, touch activated display screen, etc. While not illustrated, a display module can be provided that is operably coupled to the CPU 70 so that the operator can view the choices being made. The system activation signal can comprise both activation and processing instructions and parameters. Once created by the user interface 90, the system activation signal is transmitted to the CPU 70 for analyzation and processing. Upon receipt of the system activation signal, the CPU 70 retrieves stored process parameters that correspond to instructions embedded in the system activation signal from the memory.

Once the process parameters are retrieved from the memory, the CPU 70 creates and transmits appropriate activation/control signals to the vacuum pump 50, the radiation source 30, and the control valve 40 that correspond to the stored process parameters for each device. Upon receipt of an activation signal from the CPU 70, the radiation source 30 emits radiation energy 31 at a predetermined energy level and predetermined power level. When the radiation source is a source of e-beams or x-rays, this will require activation of the radiation source 30 by supplying power thereto. When the radiation source 30 is a source of gamma radiation, this may occur by a shielding wall being lowered or otherwise moved to an un-obstructing position.

Upon receipt of the activation signal from the CPU 70, the vacuum pump 50 is activated. Once activated, the vacuum pump 50 forces fluent food product to flow from the source 10, through the product flow cavity 29 where it is exposed to the radiation energy 31, and into the packager 60. Simultaneously therewith, the CPU 70 also adjusts the control valve 40 as necessary to maintain a pre-determined flow-rate of the fluent food product via appropriate electrical signals.

During operation, the radiation sensor 80, which in some embodiments can be a radiation power sensor, continuously measures the power of the radiation energy 31 reaching it. The radiation sensor 80 creates a signal indicative of the measured radiation power and transmits the signal to the CPU 70 for analyzation and processing. The radiation sensor 80 can be embedded in, secured to, or positioned at or near the inner surface of the second wall 22.

By knowing the (volumetric or mass) flow-rate of the fluent food product through the product flow cavity 23, the density of the fluent food product, the volume of the product flow cavity 23, and the power of the radiation energy 31 to which the fluent food product is exposed (which is supplied by radiation sensor 80), the CPU 70 can approximate the actual dose of radiation energy 31 to which the fluent food product is being exposed. The CPU 70 can then compare the approximated actual dose to a desired dose. If the approximated actual dose is not equal to or greater than the desired dose, the CPU 70 can make the necessary adjustments to the vacuum pump 50, control valve 40, and/or the radiation source 30 until the approximated actual dose is equal to or greater than the desired dose.

The packager 60 can be any device or machine that packages the fluent food product being irradiated by the system 100. By providing the packager 60 directly in the processing equipment chain, the fluent food product can be packaged and/or sealed before it becomes re-infected or re-contaminated. The type of packager 60 used will be dictated by the type of fluent food product being irradiated, but can include, for example, bottle or carton fillers, conveyor systems for facilitating packaging, wrapping machines, and form-and-fill pouch packing machines.

The irradiation chamber 20, the radiation source 30, the control valve 40, and the vacuum pump 50 may be located within a housing 110. The design of the housing 110, including the thickness and materials of which the housing 110 is constructed, is dictated by a number of factors, including, but not limited to, the type of the radiation source 30 incorporated into the irradiation system 100, space restrictions within a food processing facility, and the desired throughput capacity. For example, if the radiation source 30 emits gamma radiation, shielding the surrounding environment from the gamma radiation would be a major concern. In this instance, the housing 110 will be constructed of suitable materials having a thickness that would shield the environment from the gamma radiation being emitted by the radiation source 30. Typical materials used to house sources of gamma radiation include lead, steel, concrete, and combinations thereof. However, if the radiation source 30 emits less penetrating types of radiation, such as x-rays or e-beams, the housing 110 does not have to provide a massive shielding effect due to the inability of x-rays and e-beams to penetrate dense materials significantly. Nonetheless, in some embodiments, may still have to be provided.

While the irradiation system 100 is illustrated as having the irradiation chamber 20, the radiation source 30, the control valve 40, and the vacuum pump 50 located within the housing 110, it is possible for any number or all of these elements to be located outside of the housing 110.

The Irradiation Chamber

In FIGS. 2-8, three embodiments of an irradiation chamber suitable for use in the irradiation system 100 of FIG. 1 are disclosed. It should be noted that while three embodiments of irradiation chambers are described in detail below, various other embodiments, alterations, and modifications of the illustrated irradiation chambers will become readily apparent to those skilled in the art.

Figure 2:
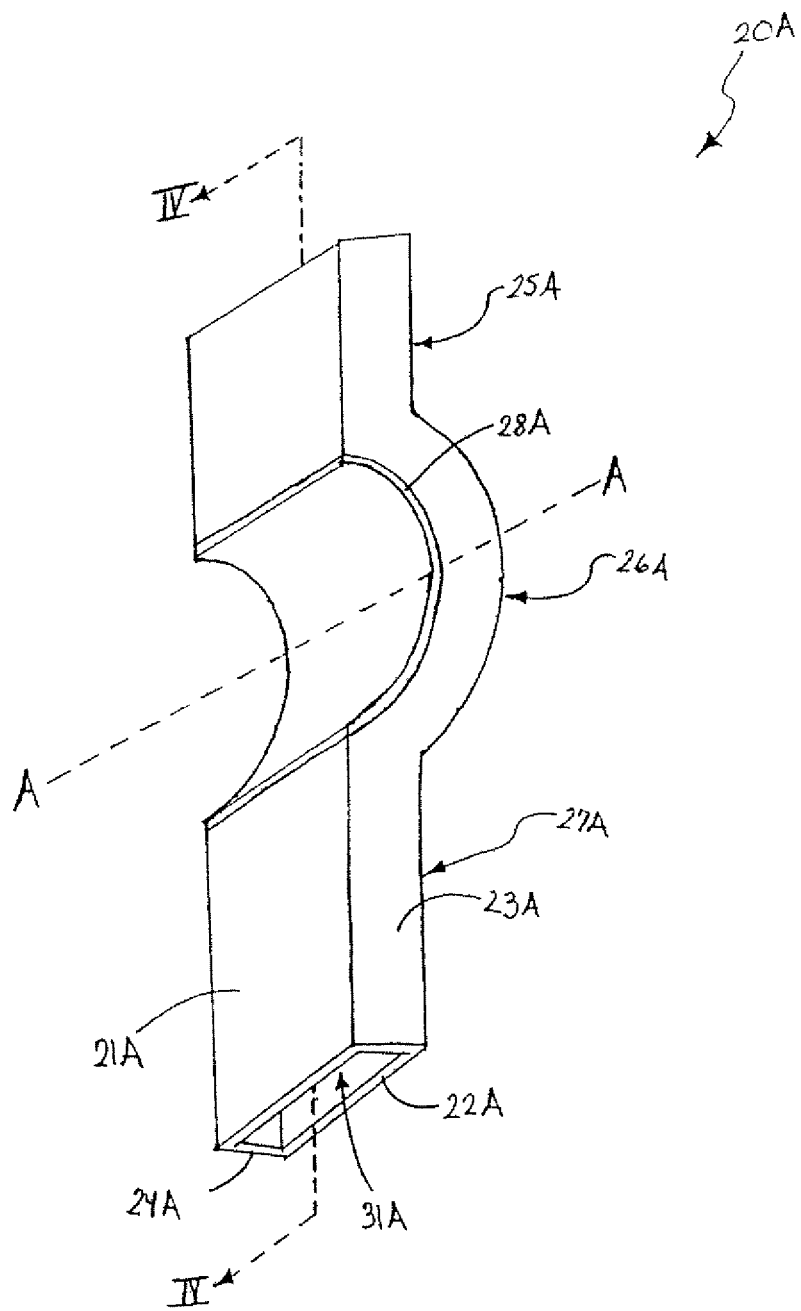
FIG. 2 is a rear perspective view of a first embodiment of an irradiation chamber according to the present invention
Figure 3:
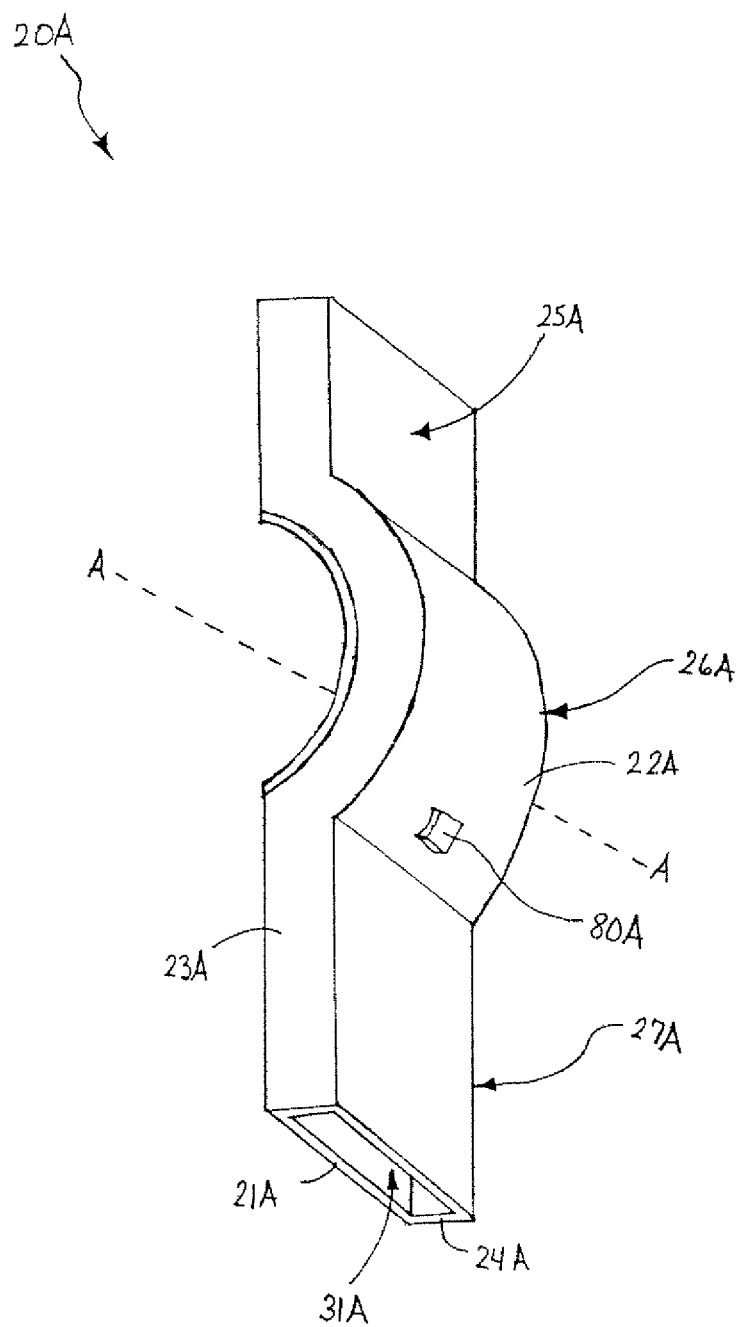
FIG. 3 is a front perspective view of the irradiation chamber of FIG. 2.
Figure 4:
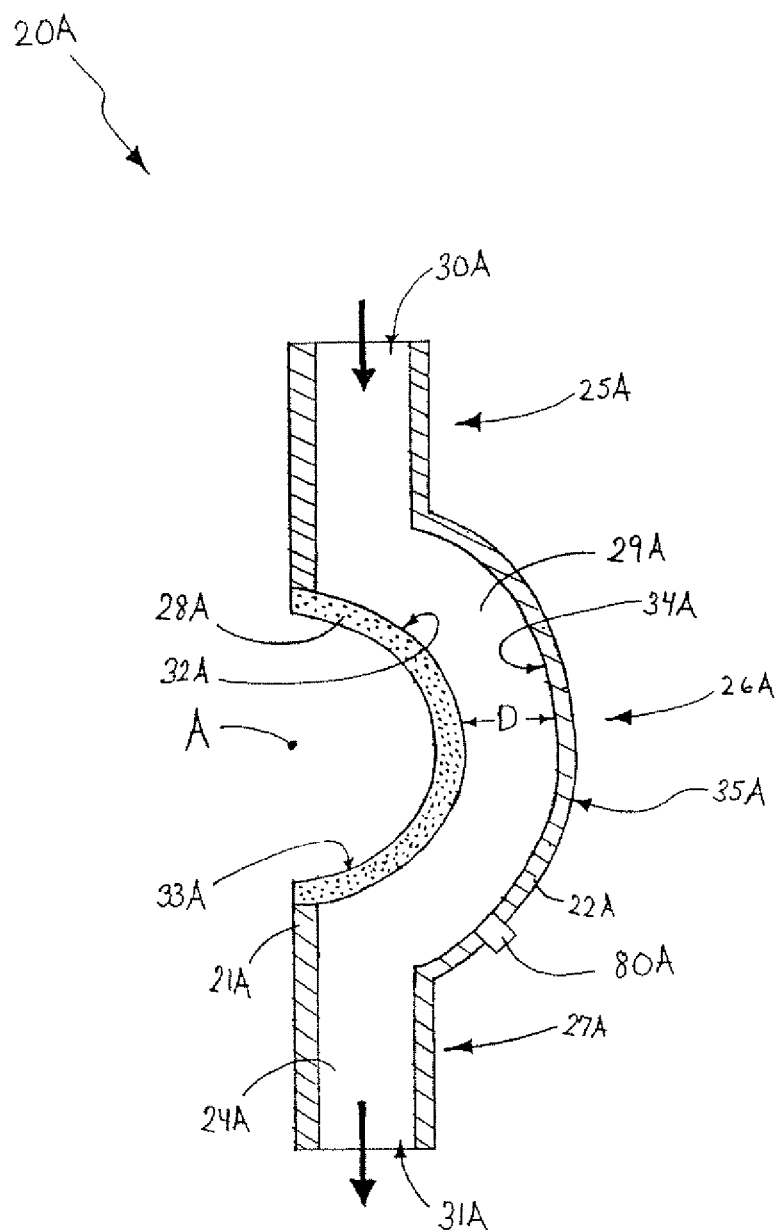
FIG. 4 is a cross-sectional view of the irradiation chamber of FIG. 2 along section line IV-IV.

In FIGS. 2-4, an irradiation chamber 20A according to a first embodiment of the present invention is illustrated. Referring specifically to FIGS. 2 and 3, the irradiation chamber 20A comprises a first wall 21A, a second wall 22A, and side walls 23A, 24A. The irradiation chamber 20A comprises an inlet duct portion 25A, an irradiating duct portion 26A, and an outlet duct portion 27A.

First wall 21A comprises a transmissive portion 28A. The transmissive portion 28A is semi-cylindrical in shape, and specifically a half cylinder. As used herein, the term semi-cylindrical is not limited to a half cylinder, but includes any angular fraction of a cylinder. The transmissive portion 28A is oriented about a central axis A-A. When the irradiation chamber 20A is incorporated into an irradiation system, such as system 100 of FIG. 1, for fluent food processing, the source of radiation is generally positioned along or next to the central axis A-A. In this manner, the radiation energy emitted by the radiation source will be emitted in cylindrical radiant pattern and will pass through the transmissive portion 28A of the first wall 21A. For example, if the radiation source is a source of e-beams, a properly configured scan horn is oriented so that its e-beam emitting portion is substantially along the central axis A-A.

Turning now to FIG. 4, a side cross-sectional view of irradiation chamber 20A along section line IV-IV is illustrated. In this perspective, central axis A-A is visible as point A only. The first wall 21A, the second wall 22A, and the side walls 23A, 24A form a product flow cavity 29A therebetween. An inlet 30A forms a passageway into the product flow cavity 29A at the top of the irradiation chamber 20A. An outlet 31A forms a passageway out of the product flow cavity 29A is provided at the bottom of the irradiation chamber 20A. When the irradiation chamber 20A is incorporated into an irradiation system, the product flow cavity 29A forms a portion of the product flow path as described in detail with respect to FIG. 1 above. Fluent food product can be flowed into the product flow cavity 29A via the inlet 30A and out of the product flow cavity 29A via the outlet 31A, as indicated by the bold arrows.

As discussed above, the transmissive portion 28A of the first wall 21A is transmissive to the radiation energy produced by the radiation source. The transmissive portion 28A of the first wall 21A can be secured into place via adhesion, bolting, screwing, welding, or the like. While the transmissive portion 28A is illustrated as being constructed of a different material and as a separable component of the remaining portions of first wall 21A, the entire first wall 21A can be constructed of the same transmissive material as the portion 28A and/or can be formed as an integral unitary piece. Additionally, if desired, the irradiation chamber 20A can be constructed without the inlet and outlet duct portions 25A, 27A.

The transmissive portion 28A of the first wall 21A comprises a convex inner surface 32A and an outer surface 33A. While the outer surface 33A is concave in the illustration, the outer surface 33A can take on any shape. The convex inner surface 32A can be formed by a plurality of planar segments forming a general arch shape or can be a single smooth arched surface. The convex inner surface 32A can have a constant curvature or a varying curvature. Preferably, all points of the convex inner surface 32A of the first wall 21A are substantially equidistant from the central axis A-A in a normal radiant direction.

Similar to the transmissive portion 28A of the first wall 21A, the portion of the second wall 22A that opposes the transmissive portion 28A of the first wall 21A is generally semi-cylindrical in shape. This portion of the second wall 22A has a concave inner surface 34A and an outer surface 35A. While the outer surface 35A of this portion is convex in the illustration, the outer surface 35A can take on any shape. The concave inner surface 34A of the second wall 22A can be formed by a plurality of planar segments forming a general arch shape or by a smooth arched surface. The concave inner surface 34A can have a constant curvature or a varying curvature.

The convex inner surface 32A of the transmissive portion 28A of the first wall 21A opposes the concave inner surface 34A of the second wall 22A so as to form the product flow cavity 29A therebetween. In embodiments of the irradiation chamber 20A that do not contain the inlet and outlet duct portions 25A, 27A, the entirety of the product flow cavity 29A will be formed between the convex inner surface 32A of the first wall 21A and the concave inner surface 34A of the second wall 22A.

The concave inner surface 34A of the second wall 22A is generally concentric to the convex inner surface 32A of the transmissive portion 28A of the first wall 21A, As a result, the product flow cavity 29A has a constant depth D. The depth D of the product flow cavity 29A is defined as the perpendicular distance from the substantially convex inner surface 32A to the concave inner surface 34A of the second wall 22A. In one embodiment, where e-beams are used to irradiate the fluent food product, the depth D of the product flow cavity 29A is preferably approximately 1 foot (0.3048 meter) or less, and most preferably approximately 3 inches (0.0762 meter) or less. By forming the product flow cavity 29A so that it has a substantially constant depth D, the dose of radiation energy to which fluent food product flowing therein is exposed is more uniform, can be more closely controlled, and requires a lower safety factor to ensure sufficient actual dose delivery.

The irradiation chamber 20A can be constructed so that the depth D of the product flow cavity 29A can be adjusted in order to vary throughput or orders of energy applied to the fluent food product. This can be done by constructing the chamber so that the first wall 21A and/or the second wall 22A are movable. For example, the first wall 21A and/or the second wall 22A can be coupled to hydraulic pistons or jacks, slidably mounted to a stationary wall or a system can be constructed wherein the first wall is stationary and the second wall can be dismantled and replaced from a selection of multiple second walls with varying dimensions and diameters to suit certain flow conditions and rheology of the food product being processed. In another embodiment the second wall 22A can be constructed of an expandable reusable or disposable material, such as natural rubber, reinforced cloth, permitted synthetic elastomers, etc. The first wall 21A and/or the second wall 22A can be moved/expanded in such a manner that the depth D of the product flow cavity 29A is increased/decreased but remains substantially constant throughout its length.

A radiation sensor 80A is embedded in the first wall 21A and/or the second wall 22A for measuring a characteristic of the radiation energy in the product flow cavity 29A. The radiation sensor 80A can be a sensor for measuring the power of the radiation energy, a dosimeter for measuring a dose of radiation energy over a selected time period, an ionization chamber, a scintillation counter, or a solid-state detector. The radiation sensor 80A is not limited to being embedded in the first and/or second wall 22A but can be positioned anywhere at or near the first and/or second wall 22A or secured to the first and/or second wall 22A itself, so long as the radiation sensor 80 is positioned so that it can measure one or more characteristics of the radiation energy in the product flow cavity 29A.

Figure 5:
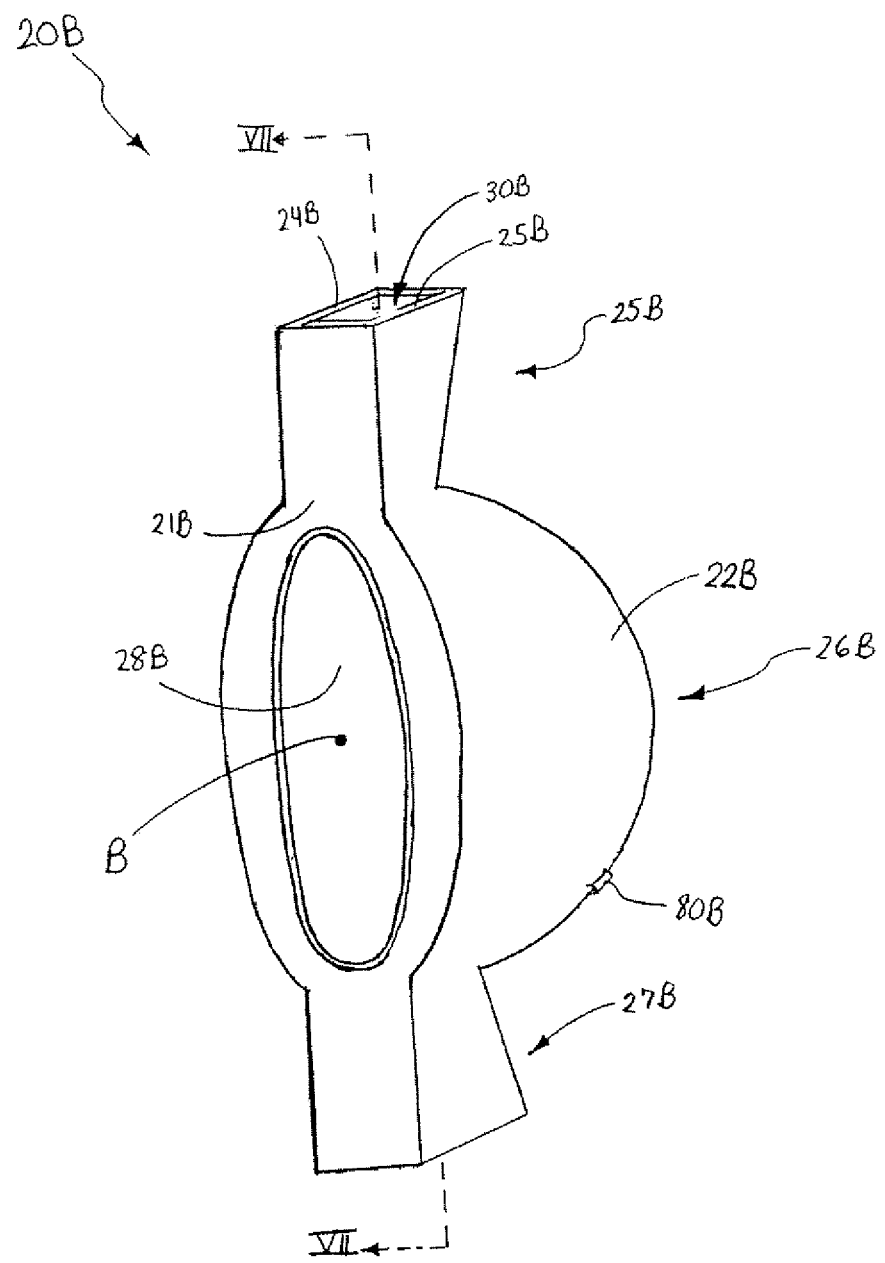
FIG. 5 is a rear perspective view of a second embodiment of an irradiation chamber according to the present invention.
Figure 6:
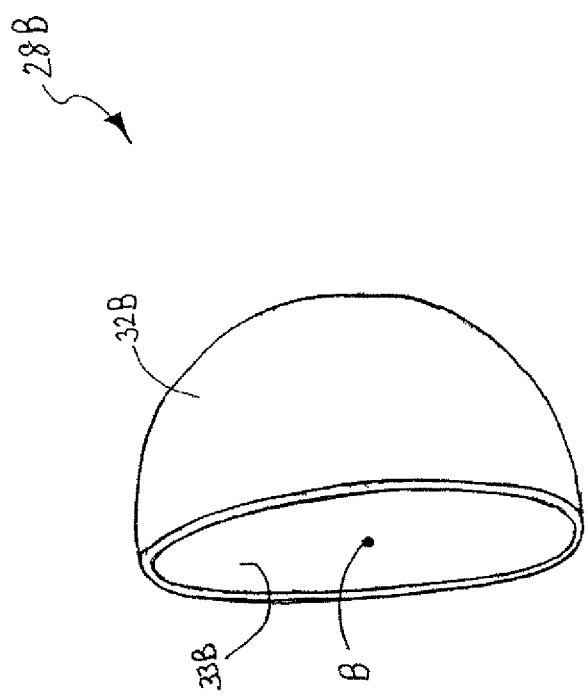
FIG. 6 is a rear perspective view of the semi-spherical transmissive portion removed from the irradiation chamber of FIG. 5 according to one embodiment to the present invention.
Figure 7:
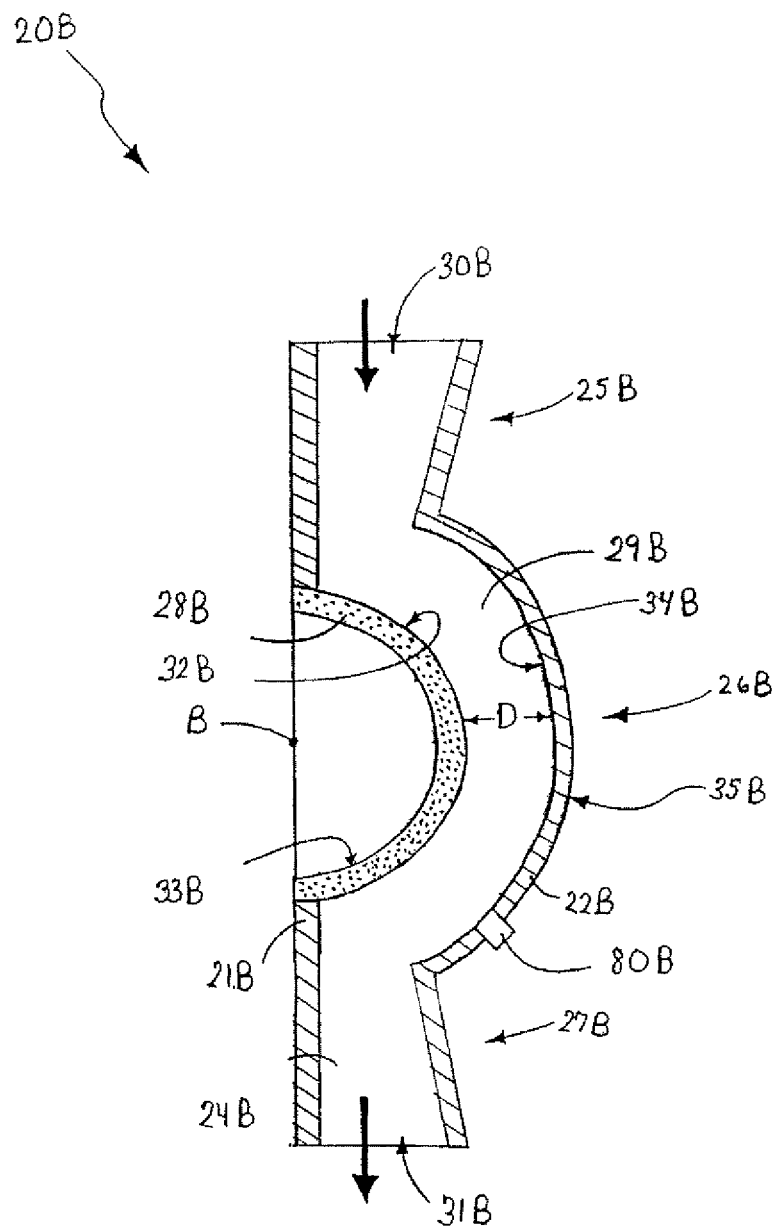
FIG. 7 is a cross-sectional view of the irradiation chamber of FIG. 5 along section line VII-VII.

Referring now to FIGS. 5-7, a second embodiment of an irradiation chamber 20B that can be incorporated into the irradiation system 100 of FIG. 1 is illustrated. The irradiation chamber 20B is similar to the irradiation chamber 20A of FIGS. 2-4. The elements of the irradiation chamber 20B are numbered to correspond to the elements of the irradiation chamber 20A with the exception that they conclude with the letter "B" instead of the letter "A." Only those characteristics/elements of the irradiation chamber 20B that differ from that of the irradiation chamber 20A will be discussed in detail below with the understanding that those skilled in the art will understand the applicability of the common characteristics/elements.

FIG. 5 is a perspective view of the irradiation chamber 20B. The first wall 21B comprises a transmissive portion 28B. The transmissive portion 28B is generally semi-spherical in shape, and specifically a half sphere (see FIG. 6). As used herein, the term semi-spherical is not limited to a half sphere, but includes any fraction of a sphere. The transmissive portion 28B of the first wall 218 is oriented about a central point B. When the irradiation chamber 20B is incorporated into an irradiation system, such as system 100 of FIG. 1, for fluent food processing, the source of radiation is positioned at or near the central point B. In this manner, the radiation energy emitted by the radiation source will be emitted in a semi-spherical pattern, passing through the transmissive portion 28B of the first wall 21B. In one embodiment, a properly configured scan horn can be oriented so that its e-beam emitting portion is substantially at or near the central point B.

Referring to FIG. 6, the transmissive portion 28B of the first wall 21B is illustrated as being removed from the irradiation chamber 20B so that the entirety of its shape can be appreciated. The convex inner surface 32B of the transmissive portion 28B is a smooth spherical surface of generally constant curvature in two directions. However, the convex inner surface 32B of the transmissive portion 28B can be formed by a plurality of planar segments forming a general spherical shape. The convex inner surface 32B can have a constant curvature or a varying curvature. Most preferably, all points of the convex inner surface 32B are substantially equidistant from the central point B.

FIG. 7 is a side cross-sectional view of irradiation chamber 20B along section line VII-VII. Unlike the irradiation chamber 20A of FIG. 2, the inlet and outlet duct portions 25B, 27B of the irradiation chamber 20B do not have a substantially constant cross section.

The portion of the second wall 22B that opposes the transmissive portion 28B of the first wall 21B is generally semi-spherical in shape. This portion of the second wall 22B has a substantially concave inner surface 34B and an outer surface 35B. The outer surface 35B of this portion is convex, but can take on any desired shape. The product flow cavity 29B is formed between the convex inner surface 32B of the first wall 21B and the concave inner surface 34B of the second wall 22B. Because the concave inner surface of the second wall 22B is generally concentric to the convex inner surface 32B of the first wall 21B, the product flow cavity 29B has a substantially constant depth D.

Figure 8:
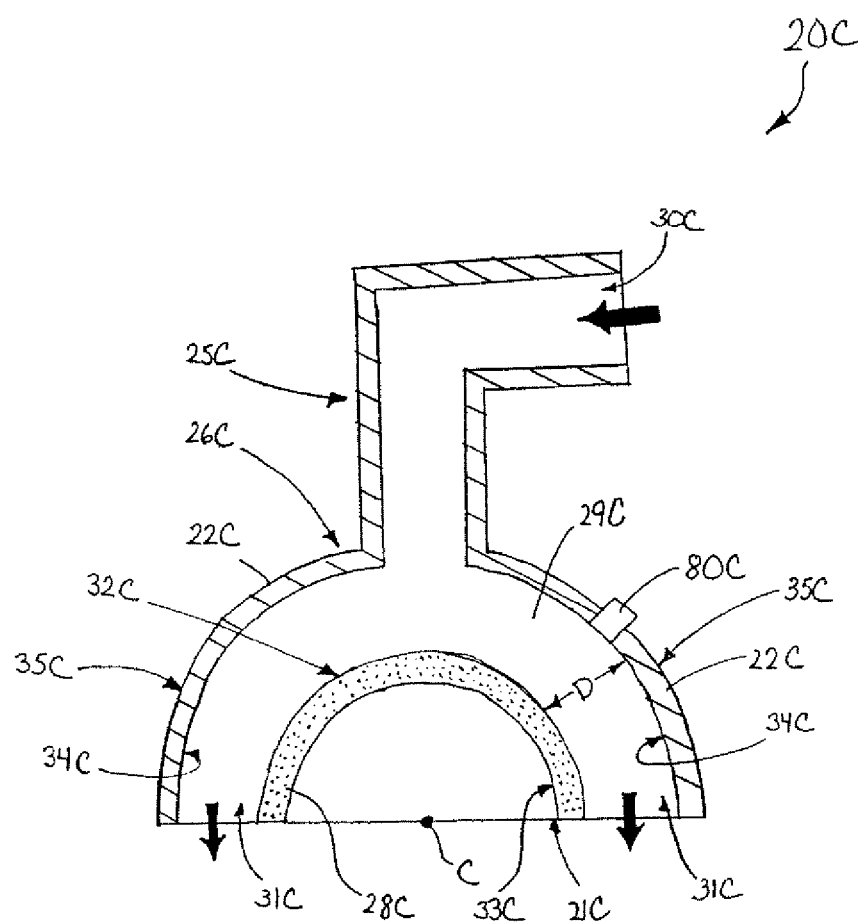
FIG. 8 is a cross-sectioned view of a third embodiment of an irradiation chamber according to the present invention.

Referring now to FIG. 8, a third embodiment of an irradiation chamber 20C that can be incorporated into the irradiation system 100 of FIG. 1 is illustrated. The irradiation chamber 20C is similar to the irradiation chambers 20A, 20B of FIGS. 2-7. The elements of the irradiation chamber 20C are numbered to match the corresponding elements of the irradiation chambers 20A, 206 with the exception that they conclude with the letter "C" instead of the letters "A" or "B." Only those characteristics/elements of the irradiation chamber 20C that differ from that of the irradiation chambers 20A, 20B will be discussed in detail below with the understanding that those skilled in the art will automatically understand the applicability of the common characteristics/elements.

FIG. 8 is a side cross-sectional view of irradiation chamber 20C. The shape of the transmissive portion 28C of the irradiation chamber 20C is identical to the transmissive portion 28B illustrated in FIG. 6. The transmissive portion 28C of irradiation chamber 20C forms the entirety of the first wall 21C. The transmissive portion 28C has a convex inner surface 32C in the form of a half sphere and an outer surface 33C. All points of the convex inner surface 32C are substantially equidistant from the central point C. The second wall 22C of the irradiation chamber 20C comprises a concave inner surface 34C and an outer surface 35C.

The concave inner surface 34C of the second wall 22C opposes the concave inner surface 32C of the transmissive portion 28C so as to form a product flow cavity 29C therebetween. Because the concave surface 34C of the second wall 22C is generally concentric to the convex inner surface 32C of the transmissive portion 28C, the product flow cavity 29C has a substantially constant depth D throughout.

The inlet duct portion 25C of the irradiation chamber 20C is L-shaped. The inlet 30C forms a passageway into a top portion of the product flow cavity 29C directly above the transmissive portion 28C. Unlike the irradiation chambers 20A, 20B, the irradiation chamber 20C does not have an outlet duct portion. Instead, the outlet 31C forms a passageway directly into the product flow cavity 29C. The inlet duct portion 25C can also be omitted if desired.

When irradiation chamber 20C is used to process fluent food products, the fluent food product is introduced into the product flow cavity 29C via the inlet 30C. Upon entering the product flow cavity 29C, the fluent food product immediately contacts the convex surface 32C near its top and spreads out along the convex inner surface 32 in all directions until it exits the product flow cavity 29C via outlet 31C.

While the irradiation chamber 30C is illustrated with transmissive portion 28C being semi-spherical in shape, it is possible for the transmissive portion 28C to be semi-cylindrical in shape, as described above with respect to irradiation chamber 20A. In an embodiment using a semi-cylindrical transmissive portion, the concave inner surface of the transmissive portion will be oriented about and equidistant from a central axis.

In some embodiments of the irradiation processing application/system of the present invention, the surface of the second wall that opposes the convex surface of the first wall does is not a concave surface. Moreover, in other embodiments, a second wall does not have to be implemented at all. In such embodiments, the fluent food product will be introduced directly in contact with the convex surface of the first wall and allowed to flow along the convex surface until it falls off. The flow rate of the fluent food product and radius of the concave surface are designed to ensure that the fluent food product is exposed to a sufficient dose of radiation energy during its time in contact with the convex surface.

Finally, it should be noted while the three embodiments of the irradiation chambers in FIGS. 2-8 are vertically oriented, it possible to orient the irradiation chambers in a horizontal or angled orientation for processing. The exact orientation will be dictated by processing needs, industrial space limitations, and user preferences.

The Irradiation Processing

Figure 9:
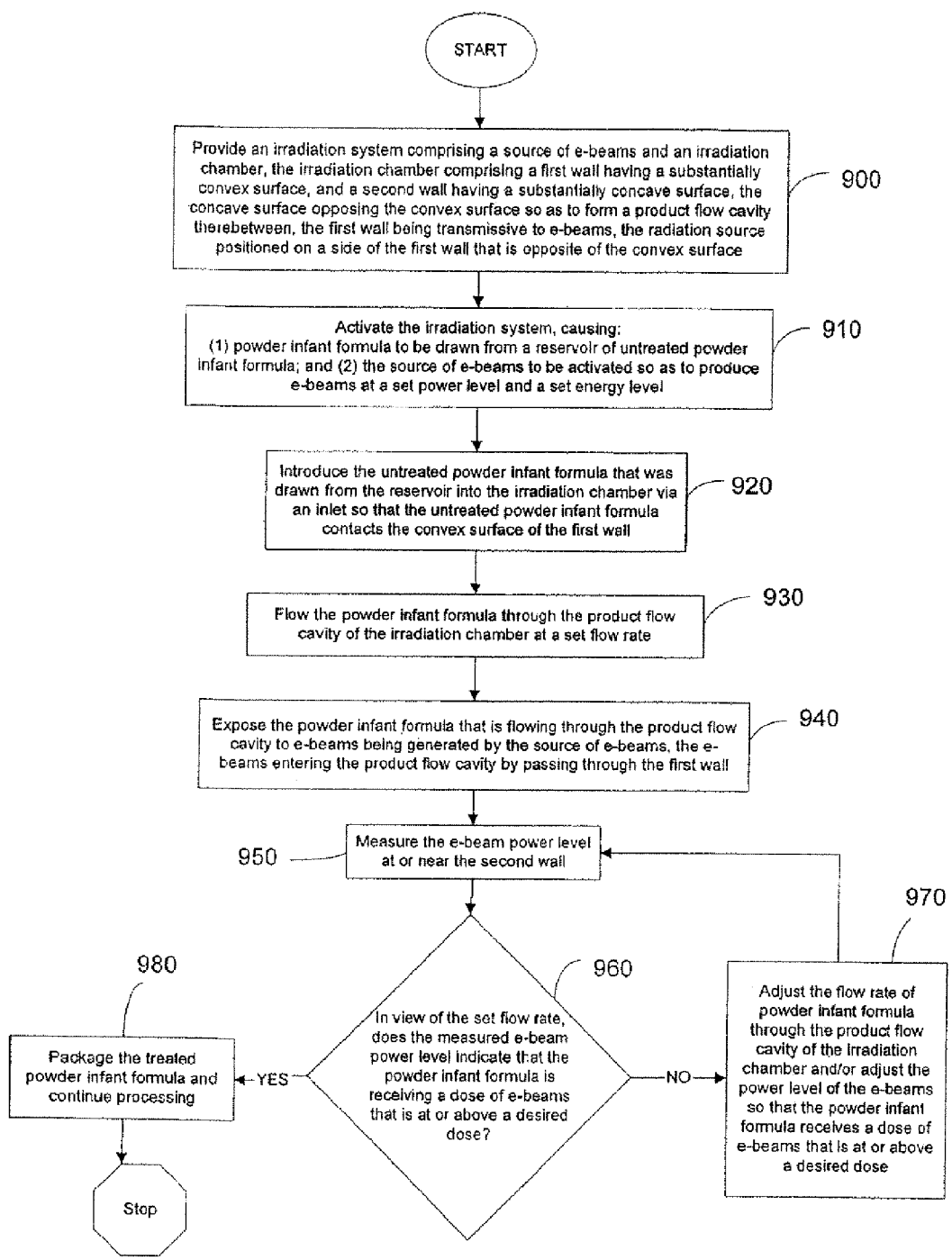
FIG. 9 is a flowchart depicting a method of irradiating powder infant formula according to an embodiment of the present invention.

FIG. 9 is a high-level flow chart of an exemplary method of irradiating fluent food products according to one embodiment of the present invention. The exemplary method may be carried out using an irradiation system incorporating any one of the irradiation chambers 20A, 20B, 20C shown in FIGS. 2-9, or any other suitably designed irradiation chamber. For ease of description only, the method of FIG. 9 will be described in detail below with respect to the irradiation system 100 of FIG. 1 having the irradiation chamber 20A of FIG. 2-4 incorporated therein. For further ease of discussion, the process of FIG. 9 is described in connection with irradiating powder infant formula with e-beams to reduce levels of *Enterobacter sakazakii* ("*E. sakazakii*"). However, the methods of the present invention are not limited to any specific type of fluent food product, radiation source, irradiation system, or contaminant irradiating purpose.

At step 900, the irradiation system 100 of FIG. 1 is provided having the irradiation chamber 20A of FIGS. 2-4 incorporated therein. The supply line 15 is fluidly coupled to the inlet 30A of the irradiation chamber 20A at one end and to the fluent food product source 10 at the other end. Similarly, one end of the outlet line 25 is fluidly coupled to the outlet 31A of the irradiation chamber 20A while the other end of the outlet line 25 is fluidly coupled to the packager 60. The fluent food product source 10 is a reservoir of powder infant formula that contains undesirable levels of the biological contaminant *E. sakazakii*. The radiation source 30 is a source of e-beams, such as a scan horn. The radiation sensor 80 is a radiation power sensor adapted to measure the power level of the e-beams reaching the sensor 80. The memory medium of the CPU 70 has a process recipe for irradiating powder infant formula with e-beams, including all the necessary operating parameters such as the desired flow rate, e-beam power level, e-beam energy level, operating vacuum for the vacuum pump 50, desired e-beam dosage, and all algorithms necessary to calculate and analyze data from the radiation sensor 80.

Once the equipment of the irradiation system 100 is properly in place, an operator inputs certain data into the user interface 90, such as the identity of the fluent food product, and activates the irradiation system 100. The user interface 90 creates a system activation signal and transmits this system activation signal to the CPU 70. Upon receipt of the system activation signal, the CPU 70 retrieves the appropriate stored recipe from its memory medium and creates and transmits corresponding activation/operating signals to the vacuum pump 50, the control valve 40, and the e-beam source 30.

Upon receipt of the activation signal from the CPU 70, the vacuum pump 50 is activated and the control valve 40 is adjusted so that the powder infant formula is drawn from the reservoir 10 and flowed along the product flow path at a predetermined flow rate. While a pump is illustrated as the means by which the flow of fluent food product through the system 100 is enabled, it should be noted that the flow of fluent food product can also be gravity enabled and controlled by adjusting the valve 40, which can be a vane valve after the reservoir 10. In such embodiments, the invention can be free of pumps.

Simultaneously, or before the activation of the vacuum pump 50, the e-beam source 30 also receives the activation/control signal from the CPU 70. As a result, the e-beam source 30 is activated, thereby emitting e-beams at a predetermined power level and at a predetermined energy level. The predetermined energy level and the predetermined power level are two of the recipe parameters that are stored in the memory medium of the CPU 70. The predetermined energy level, or at least a maximum energy level, may be mandated by a government agency. In the case of e-beams, the predetermined energy level will be no more than approximately 10 MeV. Thus, step 910 is completed.

As the powder infant formula is drawn from the reservoir 10, the vacuum pump 50 forces the powder infant formula to flow through the supply line 25 and into the product flow cavity 29A of the irradiation chamber 20A via the inlet 30A. Upon entering the product flow cavity 29A of the irradiation chamber 20A, the powder infant formula contacts the convex inner surface 32A near the top of the transmissive portion 28A of the first wall 21A, thus, completing step 920.

As the vacuum pump 50 continues to operate, the powder infant formula is flowed through the length of the product flow cavity 29A of irradiation chamber 20A until it exits the irradiation chamber 20A via the outlet 31A. As a result of the control valve 40 being properly set by the CPU 70, the powder infant formula is flowed through the product flow cavity 29A at the predetermined flow rate. The predetermined flow rate is one of the recipe parameters that are stored in the memory medium of the CPU 70. Thus, step 930 is completed.

The e-beam radiation emitted by the e-beam source 30 passes through the transmissive portion 28A of the first wall 21A and into the product flow cavity 29A of the irradiation chamber 20A. Thus, as the powder infant formula flows through the product flow cavity 29A, the powder infant formula is exposed to (i.e., irradiated by) the e-beams, completing step 940.

The predetermined flow-rate of the powder infant formula and the predetermined power level of the e-beams being emitted by the e-beam source 30 are chosen such that as the powder infant formula passes through the product flow cavity 29A, it is exposed to an actual dose ($D_A$) of e-beams that is greater than or equal to a desired dose of e-beams ($D_D$). The $D_D$ of e-beams to which the powder infant formula is to be exposed is chosen so that it is sufficient to effectively reduce levels of the *E. sakazakii*. In one embodiment, the $D_D$ of the e-beams to which the powder infant formula is to be exposed is chosen so that it reduces levels of the *E. sakazakii* to less than 10% of the original level. In this embodiment, a sufficient $D_D$ can be between 1.6 and 1.8 kiloGrays (kGy), and most preferably approximately 1.69 kGy. In another embodiment, the $D_D$ of e-beams is chosen so that it reduces levels of the *E. sakazakii* to less than 1% of the original level. For this embodiment, a sufficient $D_D$ of e-beams can be between 3.2 and 3.6 kiloGrays (kGy), and most preferably approximately 3.4 kGy. In still other embodiments, the $D_D$ of the e-beams to which the powder infant formula is to be exposed is chosen so that it reduces levels of the *E. sakazakii* to less than 0.1%, less than 0.01%, or even less than 0.001% of the original level.

The irradiation system 100 is operated so that it is ensured that the $D_A$ of e-beams to which the powder infant formula is exposed is greater than or equal to the $D_D$. One way is to set the predetermined power level of the e-beam source 30 and the predetermined flow-rate so that an amount of e-beams are emitted by the e-beam source 30 that would theoretically result in the powder infant formula being exposed to a theoretical dose ($D_T$) of e-beams while passing through the product flow cavity 29A. The $D_T$ is chosen so that it is greater than the $D_D$ by a safety factor (SF) that ensures that the $D_A$ is greater than or equal to the $D_D$. The SF can be less than or equal to 2.0, preferably less than or equal to 1.8 to 1.6, and most preferably less than or equal to 1.2.

Every material has a characteristic quality to absorb certain amount of irradiation energy. In order to determine $D_T$, for each product that is to be processed, an experiment is conducted to find out the amount of energy required and the flow rate of the product (indirectly setting the residence time of the product in the irradiation zone) to achieve a certain level of dose in kilo Grey. Due to the linear nature of dose accumulation in an electron beam accelerator, dose targets are easily achievable once dose delivery is established. The known relationship between dose and processing parameters are as follows:

$$D = k\left(\frac{I}{v}\right)$$

Where: D=Dose; k=constant; I=Current; v=velocity. The ratio between current and velocity determines the dose because k is a constant. To calculate target doses, the dose map I/v relationships are used. The $D_T$ can be calculated from experimental runs by passing a dosimeter through the product flow cavity 29A with the fluent food product. The dosimeter will measure the $D_A$ for each run performed. During each run, the e-beam source 30 is adapted to produce a $D_T$. By graphing the known $D_T$ to the $D_A$ measured for each run, a graph can be constructed relating $D_A$ to $D_T$. This will also give the SF.

Alternatively, the CPU 70 can be programmed to carry out the necessary algorithms and to store the necessary variables, flow-rate and power level, to determine the $D_T$. The following is an example of the stored variables and an algorithm necessary to calculate $D_T$.

Let: R=the set flow-rate of the fluent food product (m³/s)
V=the known volume of the product flow cavity (m³)
P=the set power level of the e-beam source in (J/s) or (MeV/s)
d=the approximated density of the fluent food product in (kg/m³)
T=the average time is takes an amount fluent food product to pass through the product flow cavity (i.e. the average time of exposure to the e-beams) (s)
E=the amount of e-beam energy to which an amount of fluent food product is exposed to while passing through the product flow cavity (J) or (MeV)
$D_T$=the target dose of e-beam energy to which an amount the fluent food product is exposed (kGy)
m=the mass of fluent food product that passes through the product flow cavity in time T (kg)

R, V, P, and d are either set or known variables that are stored in the CPU 70.

$D_T$ is determined by the equation:

$$D_T = \frac{E}{m}$$

wherein $E$ is determined by the equation: $E = P \times T$ $T$ is determined by the equation: $T = \frac{V}{R}$ $m$ is determined by the equation: $m = d \times R \times T$ Thus:

$$D_T = \frac{P \times T}{d \times R \times T}$$

$$D_T = \frac{P}{d \times R}$$

In order to ensure proper dose exposure during processing, a sensor 80 for measuring the power of the e-beam radiation during processing may be provided in the product flow cavity 29A. Other types of sensors can be used if desired, such as a dosimeter. The e-beam power sensor 80 is operably connected to the CPU 70. The e-beam power sensor 80 continuously measures the power level of the e-beams at or near the second wall 22A of the product flow cavity 29A, completing step 950. The sensor 80 creates data signals indicative of the measured e-beam power levels.

As the data signals are created by the sensor 80, the data signals are transmitted to the CPU 70 for analysis and processing. Once received by the CPU 70, the CPU 70 performs decision block 960, and determines whether in view of the set flow rate, does the measured e-beam power level indicate that the powder infant formula is receiving a $D_A$ of e-beams that is at or above the $D_D$? As discussed above, the correlation between $D_A$, $D_D$, the measured power level, and the set flow-rate can be determined through experimental analysis by placing dosimeters in the fluent food product process stream and graphing the results.

If the answer at decision block 960 is NO, the CPU 70 proceeds to step 970 and appropriately adjusts the control valve 40 so that the flow-rate of the powder infant formula through the product flow cavity 29A is adjusted to a value that will ensure that the $D_A$ of e-beams to which the powder infant formula is exposed is equal to or greater than the $D_D$. If desired, the power level of the e-beams can also be adjusted to ensure that the $D_A$ of e-beams to which the powder infant formula is exposed is equal to or greater than the $D_D$. After the adjustments are made to the flow-rate and/or the power level of the e-beams, the irradiation system 100 returns to step 950.

If the answer at decision block 960 is YES, the irradiated powder infant formula is packaged via the packager 60 and processing is continued, completing step 980. Thus, the sensor 80 can be used to ensure that the fluent food product is receiving a dosage of radiation energy that is at or below a safe level.

Example

An experiment was undertaken to determine whether e-beam processing, when used in combination with proper post-processing product handling techniques, could reduce the probability of *E. sakazakii* reaching consumers. The experiment investigated the utilization of e-beam processing for reducing pathogenic microbial load in final finished infant formula powder. E-beam radiation processing was chosen over X-rays because the throughput efficiencies of X-rays is thought to be significantly lower than those of e-beams. For example, a typical 10 MeV, 50 kW e-beam accelerator can process 31,500 kg of food per hour at a dose of 2 kGy. For an X-ray to process products with the same speed as a 10 MeV, 50 kW e-beam, it will need to have 625 kW of power. The throughput efficiency for X-rays is limited by the fact that in addition to generating photons, heavy metal targets generate considerable heat. In fact efficiencies are typically no higher that 5-8%.

The temperature of the powdered infant formula product will be in the range of 20 to 35° C. The moisture content of the powder will be in the range of 1% to 5% wt/wt. For a liquid or semi-solid product the temperature can be between 1° C. to 150° C. and moisture content between 10% to 99%.

By way of background, the amount of energy absorbed, also known as the dose, was measured in units of kiloGrays (kGy), where 1 kGy is equal to 1,000 Joules per kilogram, or MegaRads (MR or Mrad), where 1 MR is equal to 1,000,000 ergs per gram. With respect to food processing, irradiation applications can be categorized by dose level effects as follows: (1) low dose (up to 1 kGy): sprout inhibition of tubers, ripening delay of fruits, insect de-infestation; (2) medium dose (ca. 1-10 kGy): reduction of pathogenic and spoilage bacteria and parasites; and (3) high dose (over 10 kGy): complete sterility. Maximum doses approved for poultry and meat cold pasteurization are 3 kGy and 7 kGy respectively. Foods currently irradiated to high doses (e.g., 44 kGy) include those for use by astronauts during space flight, and for consumption by hospital patients with severely compromised immune systems.

The primary objective of the experiment was to quantify reduction in viable count of *E. sakazakii*, after exposure to e-beams, at incremental dose levels of 0.5, 1.5, and 3.0 kGy. The targeted reduction in *E. sakazakii* count was two log reductions (reducing the count by 100 times). The secondary objective was to determine process parameters required to achieve the targeted reduction.

Up to five *E. sakazakii* strains, from Silliker Lab's repository, were propagated in 100 mL volumes of Trypticase soy broth (TSB, Becton Dickinson & Co, Cockeysville, Md.) from frozen glycerol stock culture held at −70° C. The broth was incubated at 35° C. for 24 h. Cultures were centrifuged and the cell pellets were washed with Butterfield's phosphate diluent, and suspended in 10 mL sterile 10% (w/v) reconstituted non-fat dry milk. The cell suspensions were lyophilized for 24 h in a VirTis Model 10-117 freeze-drying chamber (Gardiner, N.Y.). The resulting non-fat dry milk powder, rich in *E. sakazakii* lyophilized cells, was packed in NASCO Whirl-pak sampling bag (1 g per sample). The sample bags are made of blended virgin, low-density polyethylene and are pre-sterilized with ethylene oxide. Bag-in-bag configuration was used to achieve proper containment of the pathogen.

Enumeration

For determination of *E. sakazakii* cells, plate count method was employed using standard methods agar (Tryptone Glucose Yeast Extract agar, TGY) incubated at 35 C for 48 h. Five replicate plates were prepared for each sample (5 sub-samples from one pouch). Three colonies from each sample (countable range plate) were streaked to VRBG plates. Typical colonies were considered confirmatory (FDA's procedure dated July 2002, Revised August 2002 (at the worldwide website address cfsan.fda.gov/~comm/mmesakaz.html).

Experimental Design

Dose Levels of 0.5, 1.5, and 3.0 kGy were used to process 15 samples (5 samples per dose level, with each sample containing 1 g of non-fat dry milk inoculated with *E. sakazakii*). Five additional un-processed samples served as control. For microbial analysis each sample was sub-sampled 5 times for determining the bacterial count. The experimental design is shown in Table 1 below.

TABLE 1

| Dose Level | Samples | Microbial Sub-samples | Labeling Notation: Energy level/ Sample ID-Sub-sample # |
|---|---|---|---|
| 0.0 kGy | 5 (A, B, C, D, E) | 5 (1, 2 . . . 5) | 0.0/A-1; 0.0/A-2 . . . 0.0/E-4; 0.0/E-5 |
| 0.5 kGy | 5 (A, B, C, D, E) | 5 (1, 2 . . . 5) | 0.5/A-1; 0.5/A-2 . . . 0.5/E-4; 0.5/E-5 |
| 1.5 kGy | 5 (A, B, C, D, E) | 5 (1, 2 . . . 5) | 1.5/A-1; 1.5/A-2 . . . 1.5/E-4; 1.5/E-5 |
| 3.0 kGy | 5 (A, B, C, D, E) | 5 (1, 2 . . . 5) | 3.0/A-1; 3.0/A-2 . . . 3.0/E-4; 3.0/E-5 |

Calibration for Dose Levels

Before conducting the tests on freeze-dried bacteria, a calibration test to determine the time required to achieve a particular dose absorption in the freeze-dried cultures was conducted. Nine pre-test samples, containing alanine pellets were exposed to E-beams in three tests (three pellets in each test) at pre-determined system parameters, as set forth in Table 2 below.

TABLE 2

|  | Test # I | Test # II | Test # III |
|---|---|---|---|
| Energy | 3.0 MeV | 3.0 MeV | 3.0 MeV |
| Current | 0.2 mA | 0.4 mA | 0.6 mA |
| Scan Width | 100 cm | 100 cm | 100 cm |
| Scan Length | 10 cm | 10 cm | 10 cm |
| Conveyor Speed | 300 cm/min | 300 cm/min | 300 cm/min |

Figure 10:
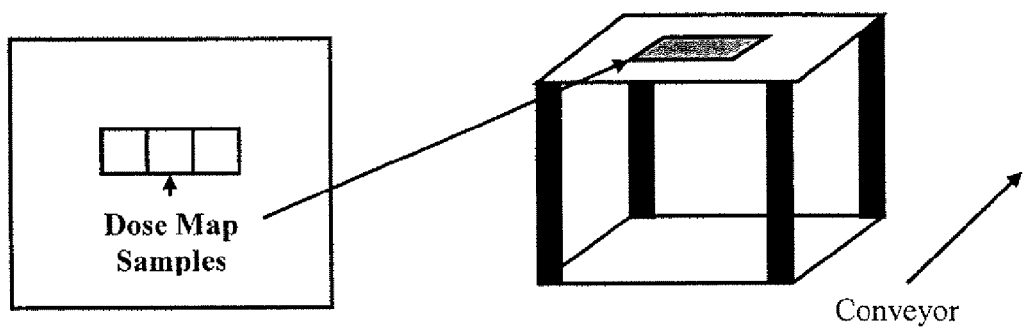
FIG. 10 is a schematic illustrating a sample holder and location of dose map samples used in an experiment to determine the effect of e-beam radiation on *E. sakazakii* in skim milk powder according to an embodiment of the present invention.
Figure 10:
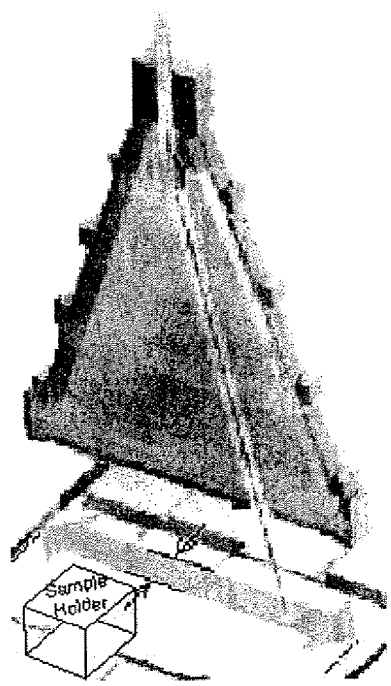
Figure 11:
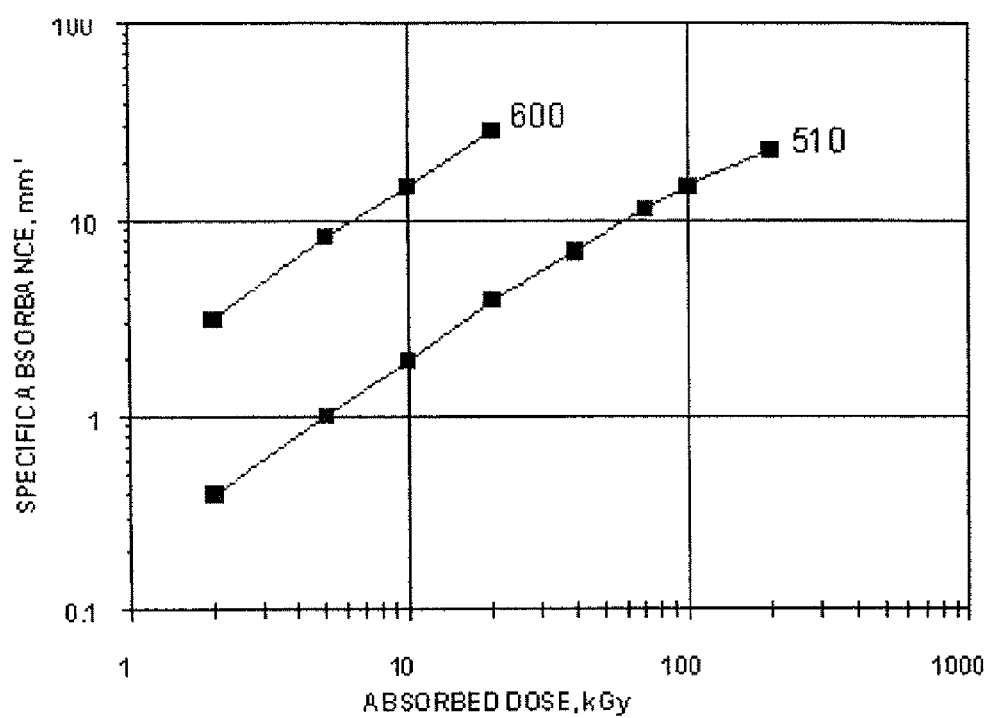
FIG. 11 is a graph of absorbed/actual dose vs. specific absorbance at different light wavelengths.

All of the tests were conducted by placing the pre-test sample pouches on the top of a processing table (sample holder) and monitored with alanine pellet dosimeters. The pouches were centered on the sample holder as shown below. The processing table moved through the beam only once with a pre-determined speed. Referring to FIG. 10, the sample holder and location of the dose map samples on the holder is shown. The direction which sample holder passed under the e-beam scan horn is also shown Table 3, below, sets froth the results obtained for various conveyor speeds.

TABLE 3

| Test | Replication | Dose (kGy) | Average | Current | Speed |
|---|---|---|---|---|---|
| I | 1 | 0.542 | 0.544 kGy | 0.2 mA | 300 cm/min |
|  | 2 | 0.543 |  |  |  |
|  | 3 | 0.548 |  |  |  |
| II | 1 | 1.087 | 1.093 kGy | 0.4 mA | 300 cm/min |
|  | 2 | 1.090 |  |  |  |
|  | 3 | 1.101 |  |  |  |
| III | 1 | 1.660 | 1.638 kGy | 0.6 mA | 300 cm/min |
|  | 2 | 1.625 |  |  |  |
|  | 3 | 1.630 |  |  |  |

Operational Parameters

Calculations

Due to the linear nature of dose accumulation in an electron beam accelerator, dose targets were easily achievable once dose delivery was established. The known relationship between dose and processing parameters are as follows:

$$D = k\left(\frac{I}{v}\right)$$

Where: D=Dose; k=constant; I=Current; v=velocity. The ratio between current and velocity determines the dose because k is a constant. To calculate target doses, the dose map I/v relationships were used as shown in Table 4 below.

TABLE 4

| Dose Mapping Data | Determining k | Targeted Dose | At Set Current |
|---|---|---|---|
| At 0.2 mA, 300 cm/min | $0.54 = k\left(\frac{0.2 \text{ mA}}{300 \text{ cm/min}}\right)$ | 0.5 kGy | $0.5 = 816\left(\frac{0.2 \text{ mA}}{v}\right)$ |
| Dose = 0.54 | Calculated k = 816 | Solve for Speed | v = 326 cm/min |
| At 0.4 mA, 300 cm/min | $1.093 = k\left(\frac{0.4 \text{ mA}}{300 \text{ cm/min}}\right)$ | 1.5 kGy | $1.5 = 820\left(\frac{0.4 \text{ mA}}{v}\right)$ |
| Dose = 1.093 | Calculated k = 820 | Solve for Speed | v = 219 cm/min |
| At 0.6 mA, 300 cm/min | $1.638 = k\left(\frac{0.6 \text{ mA}}{300 \text{ cm/min}}\right)$ | 3.0 kGy | $3.0 = 819\left(\frac{0.8 \text{ mA}}{v}\right)$ |
| Dose = 1.638 | Calculated k = 819 | Solve for Speed | v = 219 cm/min |

Radiochromic Dosimeters

Placement and Analysis

Radiochromic dosimeters were pasted at the top and bottom of each of the two pouches drawn randomly from the set of five sample pouches for each dose level. FWT-81-00 radiochromic dosimeters (Dose Range: 0.5-200 kGy (0.05-20 Mrad); 1 cm×1 cm×42-52 microns), manufactured by Far West Technology, Inc., were used for the tests. These are thin, colorless films that gradually change from colorless to a deeply colored state as a function of absorbed dose. At the time of processing, these films were in packed form in aluminum-laminated pouches to protect the dosimeters from stray light. These dosimeters use hexa(hydroxyethyl)aminotriphenylacetonitrile (HHEVC) dye. After the test, the dosimeters were retrieved by tearing open the aluminium-laminated pouch, and placed in a photometer or spectrophotometer for analysis. The dosimeters are shown below (actual size). Referring now to FIG. 1, the absorbance measured is a linear function of the dose delivered to the sample (shown for 510 and 600 nm light).

Experimental Run Parameters

Table 5, below, shown the actual experimental run parameters used during the test.

TABLE 5

| Target Dose kGy | Energy MeV | Current mA | S Power W/cm² | Sample Speed cm/min | Exposure Time second |
|---|---|---|---|---|---|
| 0.5 | 3.0 | 0.2 | 0.6 | 326 | 2.74 |
| 1.5 | 3.0 | 0.4 | 1.2 | 219 | 1.84 |
| 3.0 | 3.0 | 0.8 | 2.4 | 219 | 1.84 |

With reference to Table 5, the energy denotes the penetration power of the electrons. Current denotes the electron density hitting the sample. Specific Power denotes the power required per unit surface area of the sample. Exposure Time is the time each particle of the sample spent under the e-beam.

Results

Actual Dose Delivered

For each dose level, two of the five sample pouches were tagged with dosimeters on top and bottom. Table 6, below, lists the actual average dose delivered during processing. The difference in calculated dose and the observed dose is due to inaccurate control of the table speed and other experimental errors.

TABLE 6

| Targeted Dose | Dose at Pouch Top | Dose at Pouch Bottom | Pouch Average | Dose Delivered |
|---|---|---|---|---|
| 0.5 kGy | 0.4 kGy | 0.3 kGy | 0.35 kGy | 0.38 kGy |
|  | 0.4 kGy | 0.4 kGy | 0.4 kGy |  |
| 1.5 kGy | 1.4 kGy | 1.4 kGy | 1.4 kGy | 1.53 kGy |
|  | 1.7 kGy | 1.6 kGy | 1.65 kGy |  |
| 3.0 kGy | 3.3 kGy | 3.2 kGy | 3.25 kGy | 3.08 kGy |
|  | 2.9 kGy | 2.9 kGy | 2.9 kGy |  |

Results

Microbial Count

Figure 12:
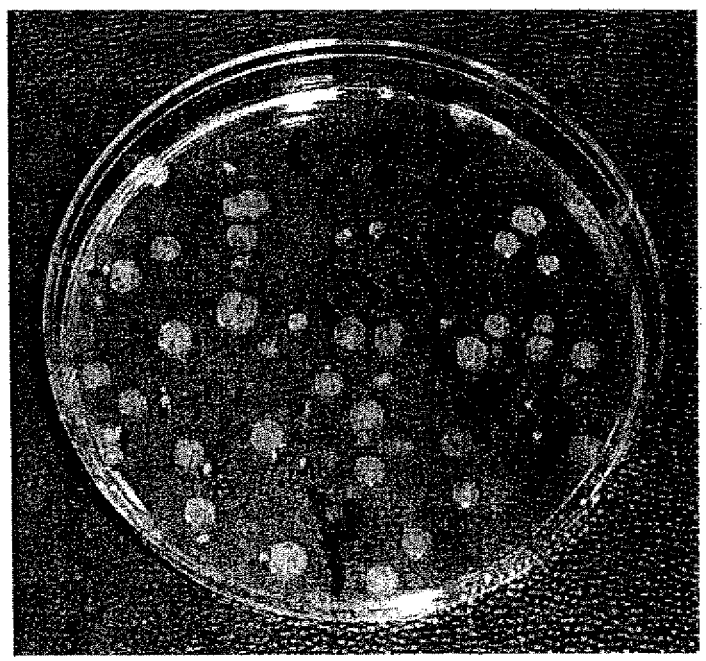
FIG. 12 depicts a standard plate used for counting the number of colony forming units during the experiment.

Samples processed by e-beam and control samples were sub-sampled five times (replicates) for enumeration purposes. A typical standard plate used for counting the number of colony forming units (cfu) and the colony counts is shown in FIG. 12.

The measured effects of the e-beam processing on the lyophilized *E. sakazakii* count is set forth in Table 7 below.

The data from Table 7 was transformed on a logarithmic scale and statistical analysis was performed on the transformed data. Analysis of variance showed significant difference (v=0.01) among the various dose levels. However, no significant difference (v=0.01) was observed within replications (sub-samples for microbial analysis). The Analysis of Variance result is shown in Table 8 below.

TABLE 8

| Source | DF | SS | MS | F | P |
|---|---|---|---|---|---|
| Dose | 3 | 50.7036 | 16.9012 | 1478.47 | 0 |
| Rep | 4 | 0.0239 | 0.006 | 0.52 | 0.719 |
| Dose * Rep | 12 | 0.0734 | 0.0061 | 0.53 | 0.886 |
| Error | 80 | 0.9145 | 0.0114 |  |  |
| Total | 99 | 51.7154 |  |  |  |

Thus, it was concluded that e-beam processing caused a significant reduction in *E. sakazakii* viability. Referring to FIG. 13, the rate of destruction is plotted. From the curve ($y=-0.591x+7.683$) of FIG. 13, it was deducted that 1.69 kGy is required to affect one log reduction in *E. sakazakii* count.

CONCLUSION

It was concluded that the above experiment decisively proved that e-beam processing helps inactivate dried *E. sakazakii* in skim milk powder. In most scientific literature it is assumed that on an average *E. sakazakii* contaminated infant formula has approximately 36 cells/10 kg of product. If an infant formula contaminated at this level is processed by e-beam at a dose level of 3.4 kGy, it will bring down the microbial load to 0.36 cells/10 kg (almost impossible to detect using current microbial testing procedures).

The various food contaminants that can be eliminated/modified using the system and method above include certain volatile flavor/smell causing compounds, large molecules

TABLE 7

| Replicate | Sample 1 | Sample 2 | Sample 3 | Sample 4 | Sample 5 |
|---|---|---|---|---|---|
| Inoculated Control (cfu/g) | | | | | |
| 1 | 50,000,000 | 56,000,000 | 32,000,000 | 46,000,000 | 57,000,000 |
| 2 | 54,000,000 | 54,000,000 | 38,000,000 | 46,000,000 | 61,000,000 |
| 3 | 54,000,000 | 51,000,000 | 51,000,000 | 50,000,000 | 49,000,000 |
| 4 | 47,000,000 | 60,000,000 | 79,000,000 | 55,000,000 | 56,000,000 |
| 5 | 47,000,000 | 45,000,000 | 47,000,000 | 56,000,000 | 50,000,000 |
| Treatment 0.5 (cfu/g) | | | | | |
| 1 | 22,000,000 | 24,000,000 | 21,000,000 | 26,000,000 | 14,000,000 |
| 2 | 19,000,000 | 29,000,000 | 23,000,000 | 31,000,000 | 26,000,000 |
| 3 | 15,000,000 | 22,000,000 | 39,000,000 | 36,000,000 | 19,000,000 |
| 4 | 19,000,000 | 23,000,000 | 18,000,000 | 33,000,000 | 14,000,000 |
| 5 | 18,000,000 | 19,000,000 | 19,000,000 | 34,000,000 | 21,000,000 |
| Treatment 1.5 (cfu/g) | | | | | |
| 1 | 6,300,000 | 8,600,000 | 6,500,000 | 6,800,000 | 8,600,000 |
| 2 | 8,600,000 | 9,700,000 | 4,900,000 | 8,000,000 | 9,100,000 |
| 3 | 8,000,000 | 6,800,000 | 5,500,000 | 5,100,000 | 14,000,000 |
| 4 | 6,900,000 | 8,000,000 | 6,100,000 | 14,000,000 | 8,600,000 |
| 5 | 7,400,000 | 9,100,000 | 5,000,000 | 8,000,000 | 8,600,000 |
| Treatment 3.0 (cfu/g) | | | | | |
| 1 | 750,000 | 660,000 | 690,000 | 450,000 | 600,000 |
| 2 | 810,000 | 680,000 | 810,000 | 580,000 | 640,000 |
| 3 | 600,000 | 770,000 | 750,000 | 490,000 | 790,000 |
| 4 | 640,000 | 570,000 | 640,000 | 410,000 | 680,000 |
| 5 | 650,000 | 560,000 | 780,000 | 550,000 | 1,100,000 | capable of polymerizing, and most bacteria, spores, fungi, molds, yeasts, and other microorganisms.

While the invention has been described and illustrated in detail, various alternatives and modifications will become readily apparent to those skilled in the art without departing from the spirit and scope of the invention. Specifically, the invention is not limited to irradiating any specific type of fluent food product, nor is the invention limited to any specific type of radiation energy. All patents, patent applications and publications created herein are incorporated by reference in their entirety.

This application claims priority benefit of U.S. Provisional Ser. No. 60/651,796, filed Feb. 10, 2005, the entire disclosure of which is incorporated herein by reference.

What is claimed is:

1. An apparatus for radiation processing of fluent food products comprising:
    a radiation source for emitting a radiation energy;
    a radiation chamber defining a product flow path and having an inlet, an outlet, a first wall, and a second wall with the first wall being positioned between the radiation source and the second wall, at least a portion of the first wall being transmissive to at least a fraction of the radiation energy emitted by the radiation source to permit the radiation energy to pass into the product flow path,
    wherein the transmissive portion of the first wall extends about the radiation source at an angle of less than 360° and has an inner surface configured in a way that the radiation source is an equidistance from substantially the entirety of the inner surface of the transmissive portion.

2. The apparatus of claim 1 wherein the transmissive portion of the first wall is semi-cylindrical in shape.

3. The apparatus of claim 2 wherein the product flow path has a substantially constant depth.

4. The apparatus of claim 3 wherein the substantially constant depth is approximately 3 inches (0.0762 meter) or less.

5. The apparatus of claim 2, wherein the transmissive portion of the first wall is a half cylinder.

6. The apparatus of claim 1, further comprising a source of fluent food product operably connected to the inlet.

7. The apparatus of claim 6 wherein the fluent food product is selected from the group consisting of pastes, liquids, powders, granular materials, gels, and semisolids.

8. The apparatus of claim 7 wherein the fluent food product is powder infant formula.

9. The apparatus of claim 1, further comprising a sensor means in the product flow path for measuring a characteristic of the radiation energy emitted by the radiation source.

10. The apparatus of claim 9 wherein the characteristic is selected from the group consisting of radiation power, radiation dose, radiation intensity, and radiation energy.

11. The apparatus of claim 10 wherein the sensor means is embedded in, secured to, or positioned at or near the surface of the second wall.

12. The apparatus of claim 1, wherein the transmissive portion of the first wall transmits the radiation energy produced by the radiation source without a significant loss in energy.

13. The apparatus of claim 12 wherein the transmissive portion of the first wall is constructed of a material selected from the group consisting of quartz, glass, synthetic polymers, laminates, heavy metal plates, and heavy metal foils.

14. The apparatus of claim 1, wherein the first wall is semi-cylindrical in shape having a central axis located outside of the product flow path, the radiation source being positioned along the central axis.

15. The apparatus of claim 1, wherein the transmissive portion of the first wall is semi-spherical in shape having a center point located outside of the product flow cavity, the radiation source being positioned at or near the center point.

16. The apparatus of claim 1, further comprising means for controlling flow rate of fluent food product through the product flow path.

17. The apparatus of claim 16 wherein the flow rate control means is operably coupled to either the inlet or the outlet.

18. The apparatus of claim 1, further comprising means for facilitating flow of fluent food product through the product flow path via the inlet and outlet.

19. The apparatus of claim 18 wherein the means for facilitating flow of fluent food product comprises a pump adapted to create a pressure or vacuum differential between the inlet and the outlet.

20. The apparatus of claim 1, wherein the radiation source is selected from a group consisting of an electron beam source, a gamma ray source, and an x-ray source.

21. The apparatus of claim 15, wherein the transmissive portion of the first wall is a half sphere.

22. The apparatus of claim 1, wherein the second wall is substantially non-transmissive to radiation energy produced by the radiation source.

23. The apparatus of claim 1, further comprising:
    means to adjust the depth of the product flow path by either expanding the second wall and/or retracting the first wall;
    a source of fluent food product operably connected to the inlet;
    a sensor means for measuring radiation energy levels in the product flow path, the sensor means embedded within, secured to, or positioned at or near the surface of the second wall;
    means for facilitating flow of fluent food product through the product flow path; and
    means for controlling flow rate of the fluent food product through the product flow path;
    wherein the second wall is concave and the product flow path has a substantially constant depth of approximately 3 inches (0.0762 meter) or less;
    wherein the transmissive portion of the first wall transmits the radiation energy produced by the radiation source without a significant loss in energy;
    wherein the first wall is a semi-spherical shape having a center point that is outside of the product flow path, the radiation source being positioned at or near the center point;
    wherein the radiation source is an electron beam source;
    wherein the inlet forms a vertical passageway into a top of the product flow path; and wherein the outlet forms a vertical passageway out of a bottom of the product flow path;
    wherein the concave surface is generally concentric to the convex surface;
    wherein a distance separates the radiation source from the first wall; and
    wherein the inlet is positioned to introduce the fluent food product into the product flow path in contact with the inner surface of the transmissive portion of the first wall.

* * * * *